United States Patent
Mata Rodriguez et al.

(10) Patent No.: US 11,949,761 B2
(45) Date of Patent: Apr. 2, 2024

(54) TECHNIQUES FOR DISTRIBUTED INTERFACE COMPONENT GENERATION

(71) Applicant: Oracle International Corporation, Redwood Shores, CA (US)

(72) Inventors: Domenica Carolina Mata Rodriguez, Seattle, WA (US); Alaa Shaker, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 140 days.

(21) Appl. No.: 17/389,116

(22) Filed: Jul. 29, 2021

(65) Prior Publication Data
US 2023/0037019 A1 Feb. 2, 2023

(51) Int. Cl.
*H04L 67/10* (2022.01)
*G06F 3/0482* (2013.01)
(Continued)

(52) U.S. Cl.
CPC ............ *H04L 67/75* (2022.05); *G06F 3/0482* (2013.01); *G06F 9/451* (2018.02); *H04L 67/10* (2013.01)

(58) Field of Classification Search
CPC ....... H04L 67/10; H04L 67/75; G06F 3/0482; G06F 9/451
See application file for complete search history.

(56) References Cited

U.S. PATENT DOCUMENTS

| 7,577,700 | B2 * | 8/2009 | Tolson | ................ | G06Q 20/105 715/764 |
| 8,397,180 | B2 * | 3/2013 | Duhig | .................. | G06F 3/0485 715/810 |

(Continued)

FOREIGN PATENT DOCUMENTS

| CN | 104239514 A | * | 12/2014 | ............. | G06F 16/95 |
| CN | 108027721 A | * | 5/2018 | ........... | G06F 17/248 |

(Continued)

OTHER PUBLICATIONS

Microsoft Learn, "Interprocess Communications—Win32 apps", published Jan. 7, 2021 to https://learn.microsoft.com/en-us/windows/win32/ipc/interprocess-communications, retrieved Sep. 11, 2023. (Year: 2021).*

(Continued)

*Primary Examiner* — Shourjo Dasgupta
(74) *Attorney, Agent, or Firm* — Kilpatrick Townsend & Stockton LLP

(57) ABSTRACT

Techniques are disclosed for efficient generation and maintenance of interface components in an infrastructure-as-a-service (IaaS) environment. A system may receive a request to display a dashboard of components. A declarative metadata set of components is generated and a multi-use agent to parse the declarative metadata set. The multi-use agent may be replicated according to the parsed declarative definition in order to create multiple instances of the multi-use agent corresponding to the one or more determined interface components. The multiple instances of the multi-use agent may then generate and maintain the interface components in real-time. Component generation may be distributed among systems to prevent excessive data transfers and wasteful communications.

20 Claims, 13 Drawing Sheets

(51) Int. Cl.
  *G06F 9/451* (2018.01)
  *H04L 67/75* (2022.01)

(56) References Cited

U.S. PATENT DOCUMENTS

| | | | | |
|---|---|---|---|---|
| 9,916,400 | B1* | 3/2018 | Winn | G06F 9/4488 |
| 9,971,747 | B2* | 5/2018 | Bourke | G06F 40/143 |
| 10,162,624 | B1* | 12/2018 | Moturu | G06F 9/45529 |
| 10,175,951 | B2* | 1/2019 | Stanfill | G06F 9/4494 |
| 10,387,130 | B1* | 8/2019 | Sandberg | G06F 8/38 |
| 2007/0101291 | A1* | 5/2007 | Forstall | G06F 3/0482 |
| | | | | 715/805 |
| 2007/0130541 | A1* | 6/2007 | Louch | G06F 3/04817 |
| | | | | 715/804 |
| 2007/0162850 | A1* | 7/2007 | Adler | G06F 9/451 |
| | | | | 715/764 |
| 2009/0303245 | A1* | 12/2009 | Soupikov | G06T 15/005 |
| | | | | 345/582 |
| 2014/0149836 | A1* | 5/2014 | Bedard | G06F 40/18 |
| | | | | 715/212 |
| 2015/0019991 | A1* | 1/2015 | Kristjánsson | H04L 41/0853 |
| | | | | 715/747 |
| 2015/0286370 | A1* | 10/2015 | Totten | G06F 3/04817 |
| | | | | 715/835 |
| 2016/0342315 | A1* | 11/2016 | Jaramillo, III | G06F 3/0484 |
| 2016/0366036 | A1* | 12/2016 | Gupta | G06F 3/0481 |
| 2017/0134381 | A1* | 5/2017 | Abdelhamed | G06F 9/451 |
| 2017/0199851 | A1* | 7/2017 | Sasikumar | G06F 40/30 |
| 2017/0199852 | A1* | 7/2017 | Sasikumar | G06F 40/177 |
| 2018/0239497 | A1* | 8/2018 | Hiremath | G06F 9/451 |
| 2018/0268372 | A1* | 9/2018 | Bussiek | G06F 3/04815 |
| 2018/0335901 | A1* | 11/2018 | Manzari | G06F 3/0488 |
| 2019/0050121 | A1* | 2/2019 | Millhouse | G06F 16/25 |
| 2019/0079980 | A1* | 3/2019 | Mallah | G06F 3/0481 |
| 2019/0102425 | A1* | 4/2019 | Obeidat | G06F 16/248 |
| 2019/0319955 | A1* | 10/2019 | Abdelhamed | G06F 9/451 |
| 2019/0354266 | A1* | 11/2019 | Wu | G06F 9/451 |
| 2020/0151042 | A1* | 5/2020 | Cohen | H04L 67/42 |
| 2020/0349207 | A1* | 11/2020 | Venkiteswaran | G06F 8/38 |
| 2020/0349221 | A1* | 11/2020 | Venkiteswaran | G06F 16/958 |
| 2020/0351175 | A1* | 11/2020 | Venkiteswaran | G06F 9/54 |
| 2020/0351176 | A1* | 11/2020 | Venkiteswaran | G06F 8/38 |
| 2020/0363939 | A1* | 11/2020 | Fitzgerald | G06F 3/04845 |
| 2021/0334453 | A1* | 10/2021 | Padula | G06F 40/174 |
| 2022/0070067 | A1* | 3/2022 | Venkiteswaran | G06F 16/953 |
| 2022/0188327 | A1* | 6/2022 | Aboobaker | G06F 3/0481 |
| 2022/0229870 | A1* | 7/2022 | Chaudhary | G06F 9/451 |
| 2022/0334809 | A1* | 10/2022 | Stone | G06F 16/958 |
| 2022/0414187 | A1* | 12/2022 | Seck | G06F 3/0482 |

FOREIGN PATENT DOCUMENTS

| | | | | |
|---|---|---|---|---|
| EP | 2443539 | B1 * | 11/2018 | G06F 15/16 |
| EP | 3839722 | A1 * | 6/2021 | G06F 3/0482 |
| JP | 2007502036 | A * | 2/2007 | |
| KR | 20140137630 | A * | 12/2014 | G06F 9/06 |
| WO | WO-2004109501 | A2 * | 12/2004 | G06F 9/451 |

OTHER PUBLICATIONS

Microsoft Edge Team, "Microsoft Edge's multi-process architecture", published Sep. 30, 2020 to https://blogs.windows.com/msedgedev/2020/09/30/microsoft-edge-multi-process-architecture/, retrieved Sep. 11, 2023. (Year: 2020).*
Packt Hub, "OpenSceneGraph: methods for improving rendering efficiency", published Feb. 4, 2011 to https://hub.packtpub.com/openscenegraph-methods-improving-rendering-efficiency/, retrieved Sep. 11, 2023. (Year: 2011).*
Plotly, "Part 4. Sharing Data Between Callbacks", published Mar. 23, 2020 to https://dash.plotly.com/sharing-data-between-callbacks, retrieved Sep. 11, 2023. (Year: 2020).*
Marti Anglada etc., "Rendering Elimination: Early Discard of Redundant Tiles in the Graphics Pipeline", available at Feb. 16-20, 2019, IEEE International Symposium on High Performance Computer Architecture (HPCA), retrieved Sep. 11, 2023 from https://ieeexplore.ieee.org/xpl/conhome/8666628/proceeding. (Year: 2019).*
Osama Al-Haj Hassan etc., "MACE: A Dynamic Caching Framework for Mashups", published in 2009 IEEE International Conference on Web Services, retrieved Nov. 13, 2023. (Year: 2009).*
Guiling Wang etc., "A Dataflow-Pattern-Based Recommendation Approach for Data Service Mashups", published in 2014 IEEE International Conference on Services Computing, retrieved Nov. 13, 2023. (Year: 2014).*
"Design the GUI—Godot Engine (3.0) document in English", published on Oct. 21, 2017 at https://docs.godotengine.org/en/3.0/getting_started/step_by_step/ui_game_user_interface.html, retrieved Nov. 13, 2023. (Year: 2017).*
Sparsh Kesari, "Web Workers, Service Workers & Worklets", published on May 15, 2021 at https://sparshkesari98.medium.com/web-workers-service-workers-worklets-2dad59df0b61, retrieved Nov. 13, 2023. (Year: 2021).*
Github, "SharedWorker", published on Feb. 13, 2017 to https://wakanda.github.io/api-reference/interfaces/sharedworker.html, retrieved Nov. 13, 2023. (Year: 2017).*
Ed Ort etc., "Mashup Styles, Part 2: Client-Side Mashups in the Java EE Platform", published in Aug. 2007 at https://www.oracle.com/technical-resources/articles/javaee/client-side-mashups.html, retrieved Nov. 13, 2023. (Year: 2007).*
Stack Overlow, "javascript—How to share data with SharedWorker", published on Oct. 3, 2020 at https://stackoverflow.com/questions/64181873/how-to-share-data-with-sharedworker, retrieved Nov. 13, 2023. (Year: 2020).*
"Repeat Widget", published Jul. 12, 2019 at https://support.ptc.com/help/thingworx_hc/thingworx_8_hc/en/ThingWorx/Help/Mashup_Builder/Widgets/RepeaterWidget.html, retrieved Nov. 13, 2023. (Year: 2019).*
Andrew Guan etc., "Workers overview", published on Dec. 8, 2020 at https://web.dev/articles/workers-overview, retrieved Nov. 13, 2023. (Year: 2020).*
Stack Overflow, "javascript—Sharing variables between web workers?", published by May 23, 2017 at https://stackoverflow.com/questions/2262681/sharing-variables-between-web-workers-global-variables, retrieved Nov. 13, 2023. (Year: 2017).*
Eiji Kitamura etc., "The Basics of Web Workers", published on Oct. 20, 2012 at https://web.dev/articles/workers-basics, retrieved Nov. 13, 2023. (Year: 2012).*
Alexandre Skyrme etc., "Scripting Multiple CPUs with Safe Data Sharing", published on Sep. 1, 2014 in IEEE Software volumn 31 issue 5, retrieved Nov. 13, 2023. (Year: 2014).*
Lucas Fernandes da Costa, "JavaScript: From Workers to Shared Memory", published on Apr. 30, 2017 to https://lucasfcosta.com/2017/04/30/JavaScript-From-Workers-to-Shared-Memory.html, retrieved Nov. 13, 2023. (Year: 2017).*
Chuks Opia, "Optimizing JavaScript Application Performance with Web Workers", published on Apr. 29, 2019 to https://www.twilio.com/blog/optimize-javascript-application-performance-web-workers, retrieved Nov. 13, 2023. (Year: 2019).*
Surma, "The State of Web Workers in 2021", published on Jun. 30, 2021 to https://www.smashingmagazine.com/2021/06/web-workers-2021, retrieved Nov. 13, 2023. (Year: 2021).*
International Application No. PCT/US2022/019566, "International Search Report and Written Opinion", dated May 18, 2022, 11 pages.

* cited by examiner

TECHNIQUES FOR DISTRIBUTED INTERFACE COMPONENT GENERATION

BACKGROUND

Cloud-based service providers offer a variety of services to customers. Customers may implement a vast number of programs and services through the service provider. Many of these services are complex and require large amounts of data to function. The service provider may choose to offer a visual interface for accessing and monitoring this information. A comprehensive modular digital interface may show a simplified view of active services to a customer. The modular digital interface may be customizable to display data and interactive components corresponding to a customer's active services and do so in a format most desirable to the customer.

Interactive components of the interface can be generated and maintained to improve the customer experience. However, displaying and maintaining multiple individual components on multiple customized personalized interfaces for multiple customers is resource-intensive. Communications between a customer and the service provider are numerous and inefficient, leading to significant system resource drain. Resource drain increases exponentially with the number of customers utilizing these processes as each one implements one or more personalized interfaces. Methods for displaying and maintaining individual components on an interface may be repetitive and inefficient, causing further resource drain and significant problems for service provider systems.

SUMMARY

Aspects of the present disclosure include techniques for generating and maintaining modular interfaces with multi-use component agents. A multi-use component agent may a streamlined digital component utilized to parse module-related declarative metadata to build an interface. Multiple instances of the multi-use component agent, or "multi-use agent," may be created to distribute component management duties efficiently. The multi-use agent instances may be further utilized within a distributed system. Multi-use agents may be hosted within a component generation engine that is communicatively coupled to server system. The server system may store and process data on behalf of a service provider while the component generation engine and associated multi-use agents perform interface generation on behalf of a client using the processed data.

An example method comprises receiving declarative metadata for displaying one or more visual components on an interface; parsing the declarative metadata to determine the one or more visual components to be displayed on the interface; replicating a component agent for each particular visual component of the one or more visual components to be displayed on the interface to create a plurality of component agents; and generating one or more sets of rendering data, each particular set of the one or more sets of rendering data generated by a particular component agent of the plurality of component agents corresponding to a particular visual component of the one or more visual components, and executable to render the one or more visual components.

Aspects of the present disclosure further include distributed data sharing across separate devices. An example method comprises receiving declarative metadata, at least a portion of the declarative metadata corresponding to one or more visual components to be displayed on an interface; parsing the declarative metadata to determine the one or more visual components; replicating a component agent for each visual component of the one or more visual components to create a plurality of component agents; and generating one or more sets of rendering data, each set of the one or more sets of rendering data generated by a component agent of the plurality of component agents and corresponding to a particular visual component of the one or more visual components, the rendering data executable to render the one or more visual components. Aspects of the present disclosure further include executing the rendering data to cause displaying the one or more visual components on an interface.

Aspects of the present disclosure further includes detecting and responding to interactions with displayed components. An example method comprises determining, based at least in part on the declarative metadata, one or more interaction responses corresponding to the one or more visual components; detecting input corresponding to an interaction with the displayed one or more visual components on the interface; and in response, causing performance of the one or more interaction responses. In some example methods the one or more interaction responses comprise at least a component update response causing an update of at least a displayed visual component of the displayed one or more visual components by updating at least a set of rendering data of the one or more sets of rendering data.

Another example method further comprises the steps above wherein the component agent parses the declarative metadata to determine a number of component agents that will be replicated to create the plurality of component agents.

Aspects of the present disclosure further include sharing data resources between replicated multi-use agent instances for efficient component and interface management. An example method comprises the steps above further comprising sending, from a first component agent of the plurality of component agents to a second component agent of the plurality of component agents, at least a portion of a set of rendering data generated by the first component agent, wherein a set of rendering data generated by the second component agent is generated based at least in part on the portion of the set of rendering data sent by the first component agent.

Aspects of the present disclosure relate to utilizing dashboard data to build declarative metadata for components of a dashboard. An example comprises the steps above wherein the declarative metadata for displaying the one or more visual components on an interface corresponds to dashboard data representing a particular configuration of the one or more visual components within a dashboard interface. The dashboard data may be built from catalogs of components for display on a dashboard. An example method further comprises receiving a listing of a plurality of visual components, the plurality of visual components comprising the one or more visual components; receiving a selection of the one or more visual components from the list of the plurality of visual components; generating the dashboard data based on the selection of the one or more visual components; and generating the declarative metadata based on the dashboard data. The selected components of the dashboard data may then be used to generate the declarative metadata for building and displaying the dashboard.

Aspects of the present disclosure relate to utilizing service metrics and measures as a portion of components for display on a dashboard interface. An example method comprises the steps above further comprising receiving service data, the service data corresponding to one or more metrics for one or more services related to the one or more visual components, wherein the one or more sets of rendering data are generated based at least in part on the declarative metadata and the service data.

Another aspect of the present disclosure comprises a system comprising one or more processors and a non-transitory computer-readable media that includes instructions that when executed by the one or more processors, cause the one or more processors to perform the methods described above.

Another aspect of the present disclosure comprises a non-transitory computer-readable media that includes instructions that when executed by one or more processors, cause the one or more processors to perform the methods described above.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
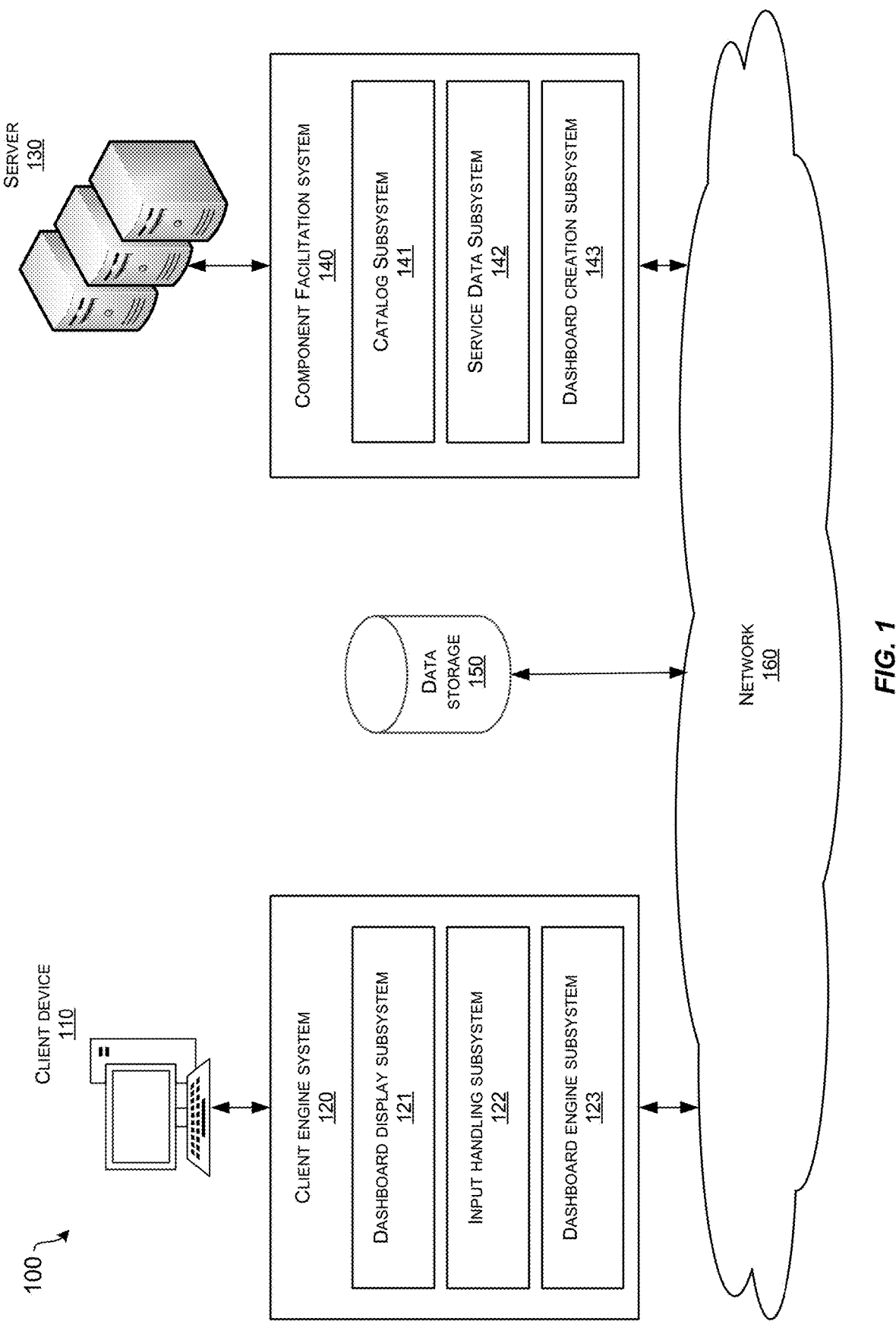
FIG. 1 is a block diagram of a distributed infrastructure-as-a service system for generating visual components according to certain embodiments of the present disclosure.

In the following description, for the purposes of explanation, specific details are set forth in order to provide a thorough understanding of certain embodiments. However, it will be apparent that various embodiments may be practiced without these specific details. The figures and description are not intended to be restrictive.

A service provider may provide services that can be subscribed to by customers (e.g., subscribers) of the offered services. Customers often utilize these services to store, manage, and update their own data using server devices owned by the service provider. For example, one service may store a customer's data in a database, another may allow a customer to access virtual machines, yet another may allow a customer to implement automated customer service for their clients, etc. Customers utilizing these features often require a comprehensive digital interface to view and manage data related to their individual service use. For example, a food vendor may utilize a service provider's web hosting services to store and manage an interactive menu of food items that the food vendor sells. The food vendor may also utilize the service provider's virtual processing environment to accept and process monetary payments for the vendor's goods. The food vendor may further utilize a service provider's data storage services to store business figures related to the vendor's sales. Services utilized by a customer and the data generated therefrom, may be numerous and complex. Each of these vendor services and data pertaining thereto may be represented by components on an interface managed by the vendor through the service provider.

Because the service provider's utilized services may vary among every customer they are connected to, service providers may wish to offer modular and customizable interfaces to their customers to make their experience more individualized. A modular interface is an interface typically comprising a shell (e.g. a static interface backdrop), and one or more components (e.g. individual panels on the backdrop displaying interactive components regarding utilized services). A customizable interface is an interface for which a customer may pick and choose the components to be displayed on the particular backdrop. An interface may incorporate both of these features for better customer experiences. The interface will convey relevant aspects of the services being utilized by a customer in a single digital location. Existing modular interfaces allow a customer to select one or more predefined components to display on the shell. For example, a service provider may store a number of pre-built interface components based on predefined code to execute and display on the shell in order to create the interface. Each individual component is modular, and will execute its code instructions independent of other interface components. Multiple interfaces of "dashboards" of components may be utilized by a customer. For example, a customer may have separate dashboards of components relating to business operations, data management operations, etc.

While independent execution of each interface component promotes modular functionality, it leads to repetitive, inefficient, and/or insecure performance by the interface and corresponding services. As one example, two components displaying the same or highly-similar information may fetch the same data independently, effectively doubling the server resource utilization for displaying the components. If a food vendor places two components on an interface—one component for sales revenue and one component for sales profit—the two components will execute and display information independent of each other. Both components will thus fetch the same sales data twice. duplicating resource expenditure. In another example, each individual interface component must comprise individual code instructions for executing procedures inherent to the component. The code instructions are a significant portion of the component's size, and utilizing multiple components with similar code increases resource utilization accordingly. When multiple components execute code on the same system to render components, the system experiences a significant resource drain.

Service providers that offer interactive digital interfaces are exposed to the problems above. The issues are compounded as customer numbers increase, often slowing or even crippling the service provider's systems. For example, service providers offering cloud-based services to millions of customers would typically be required to maintain tens of millions of individual modular components. The methods and processes described herein allow for maintenance of digital interfaces through utilizing multi-use agents in a distributed system. The multi-use agents can be replicated any number of times to manage individual interface components with minimal input. For example, a component may comprise only a declarative definition and parameters for implementing interface components. A multi-use agent may then parse the declarative definition, fetch customer data according to the parameters, and implement a component independently. By distributing component generation to a client-side engine and data storage to a central system, costly data transfers and communications are reduced.

A multi-use agent may be replicated into multiple instances to maintain different components of the interface separately. Because the multi-use agent is equipped to implement multiple different interface components based on a declarative definition, replicated instances of the multi-use agent may implement different interface components at the same time. Instances of the multi-use agent may communicate and share data amongst other actors through a shared communication protocol. The multi-use agent may also generate interactive interface components as specified by the declarative definition. These components can be maintained and monitored by the multi-use agent to respond to interactive input by a customer. Customer-specific parameters supplementing the declarative definitions may allow a multi-use agent to further customize the manner in which interactions are processed.

Implementing a multi-use agent and distributed system for generating and maintaining a plurality of interface components has various advantages over previous methods of interface generation. Removing individual code instructions for each component reduces the overhead for implementing components. Because a multi-use agent need only parse a declarative definition to generate components, a service provider will utilize system resources more efficiently and reduce data bloat during interface implementation. Additionally customers of the service provider experience a more streamlined approach to personalized interface generation.

Maintaining the interface components, by a multi-use agent and replicated instances thereof, means that the multi-use agent actor need only be fetched once in memory to begin interface generation, saving valuable computing resources. Interaction between agent instances utilizing a standard protocol also improves data communication and reduces inefficient resource expenditure. Additionally, implementing components through a multi-use agent controlled by the service provider removes the need for customers to write and implement electronic code instructions, removing significant barriers of entry for interface generation. Security functions are also improved by insulating malicious actors from direct code access, allowing a service provider to safely specify the parameters of operation for each multi-use agent and each interface component.

Further distribution of component generation among multiple systems also provides significant advantages. Processes for generating a plurality of interface components can be distributed among multiple systems to preserve resources. A service system may store a repository of components which a client may implement as a part of a client-specific interface. The components may correspond to declarative definitions parsable by a generation engine residing at a client device. In this manner, entire components and component code need not be passed to the engine through communication channels, but rather only an annotated declarative definition.

The declarative definition may be parsed and combined with client specific service data at the client-side generation engine to generate annotated rendering data. The rendering data may execute to display a complete dashboard interface to a customer. The service system and the client system may work in tandem to update the interface and interface components in real time. This distributed process prevents resource bottlenecks which would occur if the same system performed each of these steps, while reducing communicated data to minimum levels to preserve existing resources.

FIG. 1 is a block diagram of a distributed infrastructure-as-a service system for generating visual components according to certain embodiments of the present disclosure. The system 100 depicted in FIG. 1 comprises systems and devices connected directly or indirectly to a network 160. Network 160 may be any communicative entity or medium through which data may be transmitted. For example, network 160 may be an internet, intranet, cloud-based network, local area network, hard-line connection, wireless signal, virtual network, or other medium for networked communication between devices. Various networks that may be used will be recognized by one having ordinary skill in the art, and several are also discussed below.

Network 160 may be communicatively coupled to client engine system 120. Client engine system may be implemented by client device 110. Client device 110 may be any type of device operating in any format necessary to perform the embodiment described herein, and the number of client devices that may comprise an embodiment is not limited. In various embodiments, a client device 110 is a device operable by a client and/or customer to request, generate, display, and/or interact with a component interface.

Client device 110 may implement client engine system 120 as a digital program, application, or set of instructions executing on client device 110. Client engine system 120 may be a system comprising software, hardware, or a combination of both operable to perform the processes and methods described herein according to various embodiments. Client engine system 120 may further comprise a number of subsystems. Subsystems, as described herein, may refer to systems operating within a larger host system to perform more specific and specialized processes integral to the function of the host system.

Figure 3:
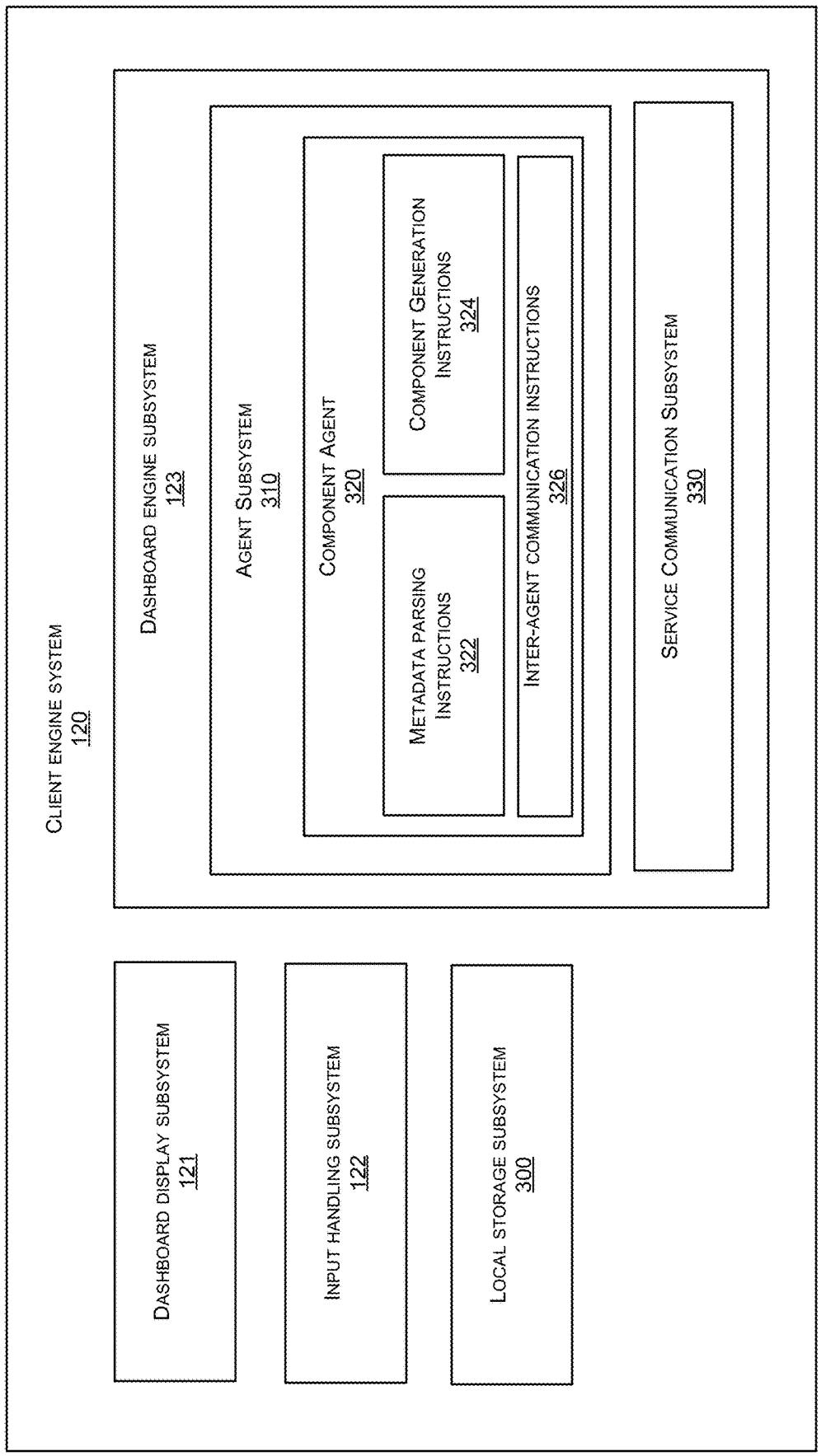
FIG. 3 is a block diagram of a client engine system according to certain embodiments of the present disclosure.

Client engine system 120 may comprise dashboard display subsystem 121. Dashboard display subsystem 121 may be a subsystem operable to display a dashboard and various dashboard components on an electronic display. Client engine system 120 may further comprise input handling subsystem 122. Input handling subsystem 122 may be a subsystem operable to detect and respond to interactive inputs made by a client and corresponding to a displayed dashboard. In various embodiments, input handling subsystem 122 may implement one or more input listeners as separate subsystems to detection one or more type of input and/or input contexts. Client engine system 120 may further comprise dashboard engine subsystem 123. Dashboard engine subsystem 123 may be a subsystem operable to parse one or more declarative definitions of a component and generate rendering data for creating a digital dashboard. In various embodiments, input handling subsystem 123 may implement one or more multi-use agents for processing and creating dashboard components in parallel. A more detailed diagram of client engine system 120 is depicted in FIG. 3.

Network 160 may be further communicatively coupled to component facilitation system 140. Component facilitation system 140 may be implemented by server 130. Server 130 may be any type of device operating in any format necessary to perform the embodiment described herein, and the number of server devices that may comprise an embodiment is not limited. In various embodiments, a server 130 is a device operable by a service provider and/or administrator to store, send, receive, render, generate, and manage generated data relating to a component-based interface.

Server 130 may implement component facilitation system 140 as a digital program, application, or set of instructions executing on server 130. Component facilitation system 140 may be a system comprising software, hardware, or a combination of both operable to perform the processes and methods described herein according to various embodiments. In various embodiments, component facilitation system 140 utilizes data sent thereto and stored therein to cause rendering of components on an interface which is displayable to a client device, such as client device 110. Component facilitation system 140 may further comprise a number of subsystems/independent systems operating as part of component facilitation system 140.

Catalog subsystem 141 may be a subsystem for storing and providing component data and/or plugin information related to one or more renderable components. Catalog subsystem 141 may be configured to store, access, and/or otherwise utilize a listing of components or data relating to components to operate a catalog. For example, catalog subsystem 141 may host a catalog of components that may be included in a dashboard display. A client may specify a subset of components chosen from the catalog for display as part of a dashboard.

Component facilitation system 140 may further comprise service data subsystem 142. Service data subsystem 142 may be a subsystem configured to provide service data and metrics related to services utilized by a client to facilitate a dashboard. The services may be services provided to a client as part of a commercial interaction between the client and a service provider. For example, a client may utilize one or more cloud-based services offered by a service provider. The service provider may store service data (i.e. metrics related to the operation of the services) in service data subsystem 142. The service data may be retrieved, transformed, and/or otherwise utilized for displaying a dashboard comprising the service data.

Component facilitation system 140 may further comprise dashboard creation subsystem 143. Dashboard creation subsystem 143 may be a subsystem operable to create a dashboard and populate the dashboard with components. For example, a dashboard creation subsystem 143 may be configured to receive a dashboard specification from the client engine system 120. The dashboard creation subsystem 143 may utilize the dashboard specification to create a new instance of a dashboard interface associated with a client. For information Network 160 may be further communicatively coupled to data storage 150. Data storage 150 may comprise one or more electronic data storage memories for facilitating the embodiment described herein. Storage may refer to any physical, electronic, and/or cloud-based storage for facilitating the embodiments described herein. Data memories may be an internal, storage memory or medium which stores electronic data internal, external, or separate from another system. For example, data storage 150 may store data or information related to communication protocols between client engine system 120 and component facilitation system 140 by which network 160 may interact with both entities. It will be appreciated that data storage 150 or any other storage may be used in any necessary manner to facilitate the processes described herein.

Figure 2:
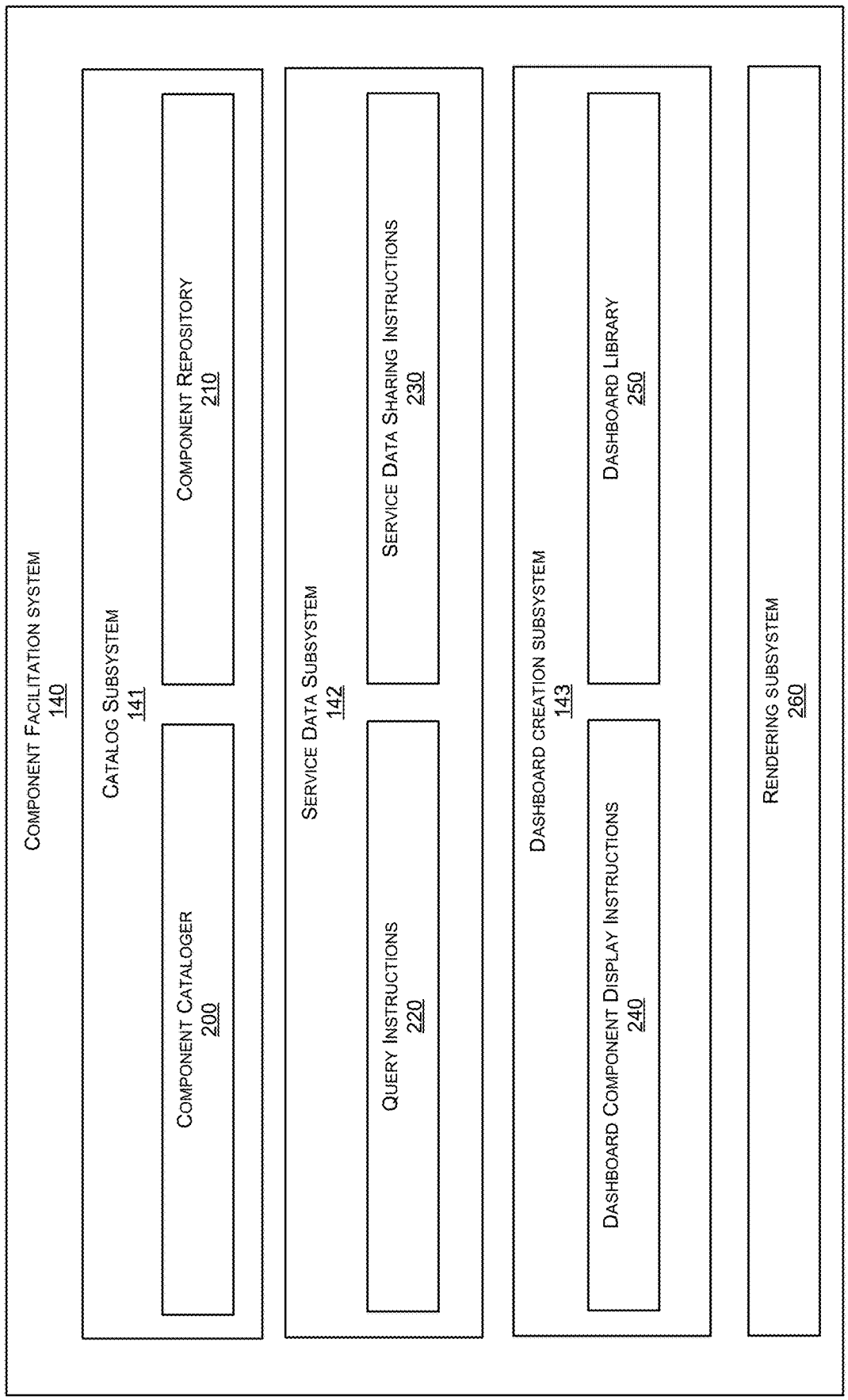
FIG. 2 is a block diagram of a component facilitation system according to certain embodiments of the present disclosure.

FIG. 2 is a block diagram of a component facilitation system 140 according to certain embodiments of the present disclosure. Specifically, FIG. 2 depicts component facilitation system 140 and various subsystems comprised therein. Component facilitation system 140 may comprise catalog subsystem 141. Catalog subsystem 141 may comprise component cataloger 200. In various embodiments, a component cataloger may be a subsystem which catalogs a number of components to create a component list. The component list may correspond to a number of visual components which will be displayed on a dashboard as part of an interface. For example, the component cataloger 200 may be communicatively coupled to a component manifest intake module and a number of plugins which store components. The component cataloger may use a component manifest to identify a number of components in the plugins to create a component list. The component list may be a listing of components to receive from a component repository.

Catalog subsystem 141 may further comprise component repository 210. Component repository 210 may be a repository of components or component information which are implementable in a dashboard interface. In various embodiments, component repository 210 receives a component list from component cataloger 200. Component repository 210 or a similar entity may then identify and group one or more sets of declarative metadata relating to the visual components identified on the component list. For example, component cataloger 200 may send a component list to component repository 210 specifying a component for a digital component "widget" to be generated for display on a dashboard interface. The component repository 210 may identify declarative metadata relating to the function of that digital component for further processing.

Component facilitation system 140 may comprise service data subsystem 142. Service data subsystem 142 may comprise query instructions 220. Query instructions 220 may be instructions for receiving and/or processing a query for service data related to a dashboard. In various embodiments, query instructions 220 may be configured to extract, from an incoming service data query, one or more requests for service data.

Service data subsystem 142 may further comprise service data sharing instructions 230. Service data sharing instructions 230 may be a set of instructions for retrieving and transmitting service data related to services operable by a service provider. In various embodiments, service data sharing instructions 230 receive an indication of service data specified by query instructions 220. Service data sharing instructions 230 may then responsively retrieve one or more sets of service data related to services. For example, query instructions 220 may specify one or more metrics related to operation of a service and which will be displayed as part of a dashboard interface. Service data sharing instructions 230 may identify the relevant services executing at a service provider, retrieve metrics related to operation of the services, and transmit the service data back to the querying entity.

Component facilitation system 140 may comprise dashboard creation subsystem 143. Dashboard creation subsystem 143 may comprise dashboard component display instructions 240. Component display instructions 240 may be a set of instructions that cause display of a component on a visual dashboard interface or the creation of data to do the same. In various embodiments, dashboard component display instructions 240 received display, such as display data generated by query instructions 220. Dashboard component display instructions 240 may cause sending of the display data to a device comprising a digital display, such as client device 120. The display data may then be used to display the components on the digital display. In various embodiments, dashboard component display instructions 240 generate the display data based on the rendered components.

Dashboard creation subsystem 143 may further comprise dashboard library 250. Dashboard library 250 may be a storage or repository comprising data for generating a portion of a specific interface/dashboard. In various embodiments, dashboard library 250 contains one or more common components which may be displayed directly onto the interface without requiring generation prior to display. In various embodiments, dashboard library 250 contains one or more dashboard shells for generating a dashboard interface which can be populated with components. In various embodiments, dashboard data from dashboard library 250 is sent to a client device, such as client device 120, to generate a dashboard shell which will be populated with components as they become available for display from dashboard component display instructions 240.

Component facilitation system 140 may further comprise rendering subsystem 260. Rendering subsystem 260 may be configured to render components for display on a dashboard as part of a server-side rendering configuration. For example, rendering subsystem 260 may receive dashboard data generated by dashboard creation subsystem 143. Rendering subsystem 260 may convert the dashboard data to rendering data which may be sent to a client device for displaying a rendered version of the dashboard interface. Further examples of interaction between client device 120 and the subsystems of component facilitation system 140 will be described below with regard to FIG. 4.

FIG. 3 is a block diagram of a client engine system according to certain embodiments of the present disclosure. Specifically, FIG. 3 depicts client engine system 120 and various subsystems comprised therein. Client engine system 120 may comprise dashboard display subsystem 121. Dashboard display subsystem 121 may be a subsystem within client engine system 120 which facilitates display of a dashboard interface on an electronic display of a client device, such as client device 110. In various embodiments, dashboard display subsystem 121 is configured to receive and utilize display data to cause displaying the dashboard interface.

Client engine system 120 may further comprise input handling subsystem 122. Input handling subsystem 122 may be a subsystem within client engine system 120 for detecting and handling input. In various embodiments, input handling subsystem 122 facilitates use of one or more input listeners to detect interaction and/or input from a user of a device. In various embodiments, input handling subsystem 122 may generate data corresponding to a detected input and send the data to a system for causing an update of a corresponding component. For example, in response to detecting input corresponding to a particular component displayed on a dashboard interface, input handling subsystem may generate interaction metadata and send the interaction metadata to a module for causing a responsive update, such as update instructions 230.

Client engine system 120 may further comprise local storage subsystem 300. Local storage 300 may be a storage or repository storing one or more sets of data related to a client device. In various embodiments, local storage subsystem 300 comprises data relating to one or more sets of information relevant to the function of one or more components. Local storage subsystem 300 may store, send, and otherwise utilize this information to facilitate the generation of components as described herein. For example, as part of a component generation process, local storage subsystem 300 may send relevant client data to a generation engine to complete generation of a component. In an example embodiment, a component may display an indication of a customer's profit in a widget component on a dashboard interface. The profit information is stored client-side on the customer's device. The component may correspond to an incomplete declarative definition which requires client data to display. In this case, the required client data is the profit data stored client-side. As part of the generation process, a component generation engine may solicit the profit data from local storage subsystem 300 to complete generation of the component.

Client engine system 120 may further comprise dashboard engine subsystem 123. Dashboard engine subsystem may be a component generation engine which facilitates utilisation of multi-use agents for generating one or more components as part of a dashboard interface display process. Dashboard engine subsystem 123 may comprise agent subsystem 310. Agent subsystem 310 may be a subsystem of dashboard engine subsystem 123 which facilitates creation, maintenance, replication, and/or deletion of one or more multi-use agents for generating components for a dashboard interface.

Agent subsystem 310 may comprise component agent 320. Component agent 320 may be a multi-use agent as described herein in an instantiated or non-instantiated/stored state. In various embodiments, component agent 320 comprises data stored in agent subsystem 310 which is activated in response to receipt of a declarative definition. For example, in response to the client engine system 120 receiving declarative metadata, such as metadata from a component facilitation system 140, client engine system 120 instantiates a component agent 320 within the dashboard engine subsystem 123. In various embodiments, component agent 320 receives and parses the declarative metadata to begin a component generation process. Component agent 320 may comprise metadata parsing instructions 322. Metadata parsing instructions 322 may be instructions utilizable by the component agent 320 to parse metadata, such as declarative metadata.

Component agent 320 may further comprise component generation instructions 324. Component generation instructions 324 may be instructions for generating a component based on parsed declarative metadata. In various embodiments, an instantiated component agent may be replicated at least once for each component to be generated. In various embodiments, the component agent 320 may retrieve client information from a local storage, such as local storage subsystem 300 in order to cause generation of a component. The component generation process is further described in FIG. 5. In various embodiments, component generation instructions 324 of a component agent 320 may be configured to utilize declarative metadata parsed by the component agent 320 to produce rendering data as part of a client-side rendering configuration. For example, a component agent 320 may parse metadata from the declarative definition and transform the metadata into rendering data that is executable to cause display of a corresponding visual component of a dashboard interface. Component agent 320 may further comprise inter-agent communication instructions 326. Inter-agent communication instructions 326 may be instructions for causing communication between two or more instantiated component agents as part of a component generation process.

Dashboard engine subsystem 123 may comprise service communication subsystem 330. Service communication subsystem 330 may be a subsystem of client engine system 120 which facilitates communication between one or more services and client engine system 120. For example, one or more external services related to a component or data required to generate a component may be received from an external service and utilized by client engine system 120 to generate one or more components.

Figure 4:
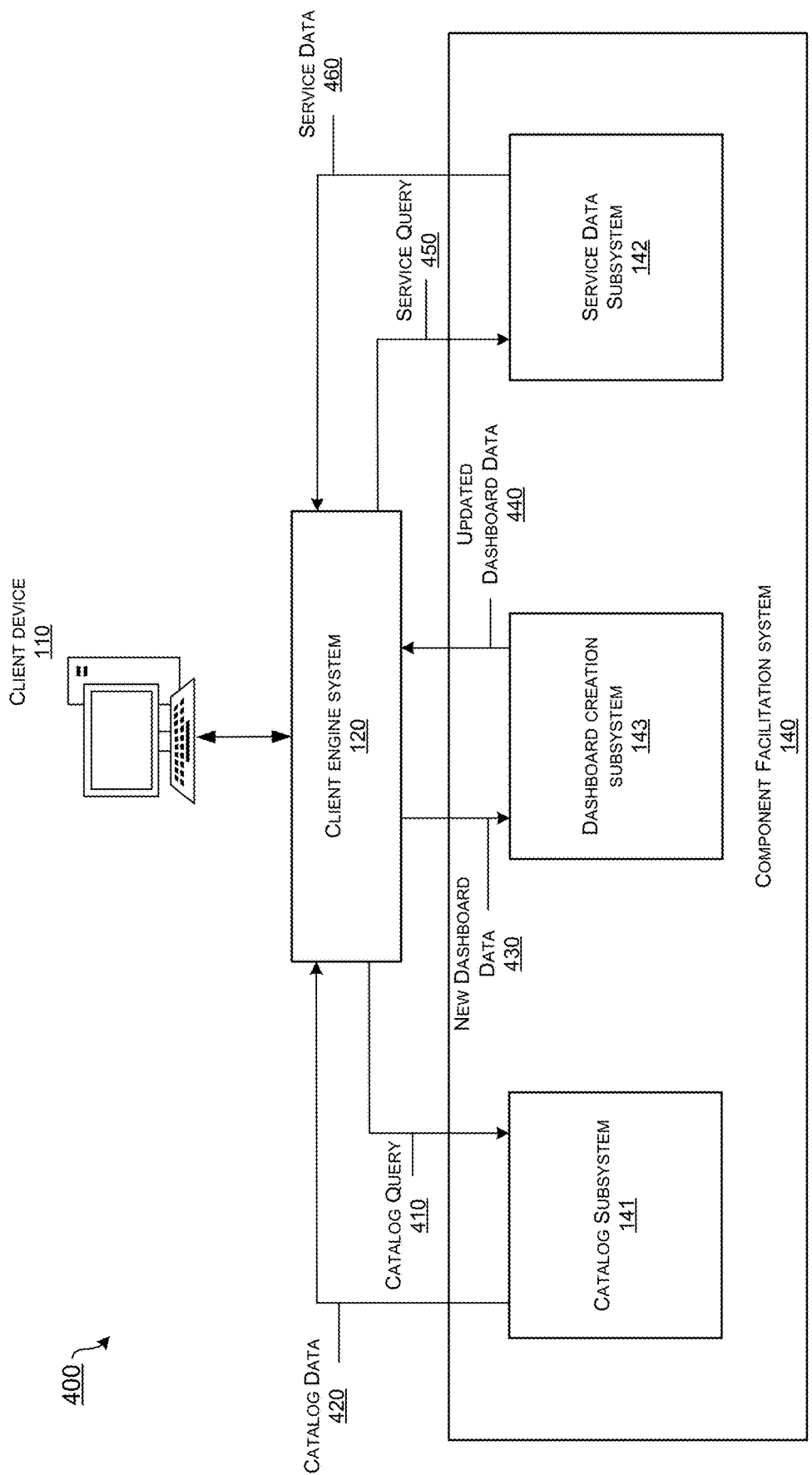
FIG. 4 is a block diagram illustrating interaction between a client engine system and subsystems of a component facilitation system according to certain embodiments of the present disclosure.

FIG. 4 is a block diagram illustrating interaction between a client engine system 120 and subsystems of a component facilitation system 140 according to certain embodiments of the present disclosure. As depicted in FIG. 4, distributed system 400 comprises client engine system 120, which is communicatively coupled to client device 110. Client device 110 may be a device through which a user may specify, generate, view, and/or interact with a dashboard. As depicted in FIG. 4, within distributed system 400, client engine system 120 may be further communicatively coupled to subsystems of component facilitation system 140 for these purposes.

Client engine system 120 may be communicatively coupled to catalog subsystem 141 of component facilitation system 140. Client engine system 120 may be configured to send, to catalog subsystem 141, a catalog query 410. A catalog query 410 may be a query for a listing of components available for display as part of a dashboard interface. In response to receiving catalog query 410, catalog subsystem 141 may be configured to send catalog data 420 to client engine system 120. For example, a user of client device 110 may utilize client engine system 120 to query for a listing of components that may be displayed as part of a user-personalized dashboard interface. Catalog subsystem 410 may receive the query and return a listing of cataloged components to client engine 120. Client engine 120 may then select components from the component catalog for inclusion in the user-personalized dashboard interface. In various embodiments, the catalog subsystem 410 is a widget catalog subsystem. The widget catalog subsystem may store and send, to the client engine system 120, a list of available widgets for a user of the client device 110 to select from, add to a widget component dashboard, configure, or otherwise utilise.

Client engine system 120 may be further communicatively coupled to dashboard creation subsystem 143 of component facilitation system 140. Client engine system 120 may be configured to send, to dashboard creation subsystem 143, new dashboard data 430 corresponding to a desired dashboard configuration. In response to receiving new dashboard data 430, dashboard creation subsystem 143 may be configured to generate data relating to the configuration of the new dashboard. Dashboard creation subsystem 143 may be configured to send the generated data to client engine system 120 as updated dashboard data 440. For example, a user of client device 110 may create a "mock" dashboard that the user desires to review on client device 110. The client may utilize client engine system 120 to send new dashboard data 430 to dashboard creation subsystem 143, which will generate updated dashboard data 440. Updated dashboard data 440 may comprise declarative metadata for creating a functional dashboard corresponding to the "mock" dashboard created by the user. Updated dashboard data 440 may be stored in a dashboard library 250 of dashboard creation subsystem 250 prior to being sent to client engine system 120. In various embodiments not pictured in FIG. 4, dashboard creation subsystem 143 may utilize a rendering subsystem, such as rendering subsystem 260, to generate rendering data based on the updated dashboard data 440 as part of a server-side rendering configuration system. In various embodiments, the updated dashboard data 440 includes a declarative definition corresponding to a widget definition, the widget definition include declarative metadata for rendering one or more widget components on a dashboard interface in a customized configuration specified by a user.

Client engine system 120 may be further communicatively coupled to service data subsystem 142 of component facilitation system 140. Client engine system 120 may be configured to send, to service data subsystem 142, service query 450. Service query 450 may be a query for service data/metrics related to the performance and/or state of one or more services maintained by a service provider. In response to receiving service query 450, service data subsystem 142 may be configured to generate service data 460 relating to the performance of one or more services specified by service query 450. Service data subsystem 142 may be configured to send the generated service data 460 to client engine system 120. For example, a user of client device 110 may specify one or more performance metrics of services utilized by the user that are sought as displayable elements of the dashboard interface. The one or more performance metrics may be combined with one or more components on the dashboard interface to show a performance of those services as part of the dashboard interface. The client may utilize client engine system 120 to send service query 450 to service data subsystem 142, which will generate service data 460. In various embodiments service data 460 includes widget data utilizable by a multi-use agent to generate one or more widget components on a dashboard interface. For example, service data 460 may comprise widget data which may be inserted into one or more component widgets. The widget components may display a portion of the received widget data to display some aspect of a service within the widget component. In various embodiments, service data 460 may comprise metrics and/or other service data relating to a performance of services. For example, service data 460 may comprise metrics, logging data, billing data, search data, etc. related to services operated by a service provider. In various embodiments, the service data relates to aspects of cloud-based services hosting on a cloud-infrastructure operated by the service provider. A client may have access to or otherwise utilize these cloud-based services, and the received service data may relate to aspects/performance data regarding those cloud-based services that the client may access/utilise.

In various embodiments, component agents 320 within client engine system 120 may facilitate display of a dashboard interface through communication with the systems of component facilitation system 140 depicted in FIG. 4. For example a user of client device 110 may query for a listing of components from catalog subsystem 141. Catalog subsystem 141 may send catalog data corresponding to a listing of cataloged components to the client engine system 120. The user may select a subset of components in a particular configuration to build a dashboard interface. The configuration may be packaged as new dashboard data and sent to a dashboard creation subsystem 143. Based on the configuration specified by the dashboard data, the dashboard creation subsystem 143 may generate updated dashboard data in the form of declarative metadata. The declarative metadata may be sent to client engine system 120 for rending in a client-side rendering configuration or rendered directly in a server-side rendering configuration.

In the client-side rendering configuration, the declarative metadata is received by client engine system and a component agent 320 such as a multi-use agent parses the declarative metadata. A number of multi-use agents are replicated to build the components specified by the declarative metadata. To complete a rendering of the components, one or more multi-use agents may query a service data subsystem 142 for service data which will be displayed as part of the components of the dashboard definition. The service data subsystem will return service data to the multi-use agents. In embodiments utilizing a server-side rendering configuration, the service data is sent to the dashboard creation subsystem directly to generate the rendering data.

Returning the client-side rendering configuration, the multi-use agents utilize both the declarative metadata and the service data received from the service data subsystem to generate rendering data executable to display the dashboard interface in the configuration specified by the user. The client engine system 120 may actively monitor the displayed dashboard components using the multi-use agents. For example, the multi-use agents may periodically fetch new service data from service data subsystem 142 to update the displayed components in real-time. The multi-use agents may also react to user input at the displayed components of the dashboard interface and respond accordingly. In various embodiments, a user may edit the configuration of the dashboard interface and the client engine system 120 may send new dashboard data to the dashboard creation subsystem 143 to cause receiving updated dashboard data comprising an updated declarative definition for a new dashboard configuration.

Figure 5:
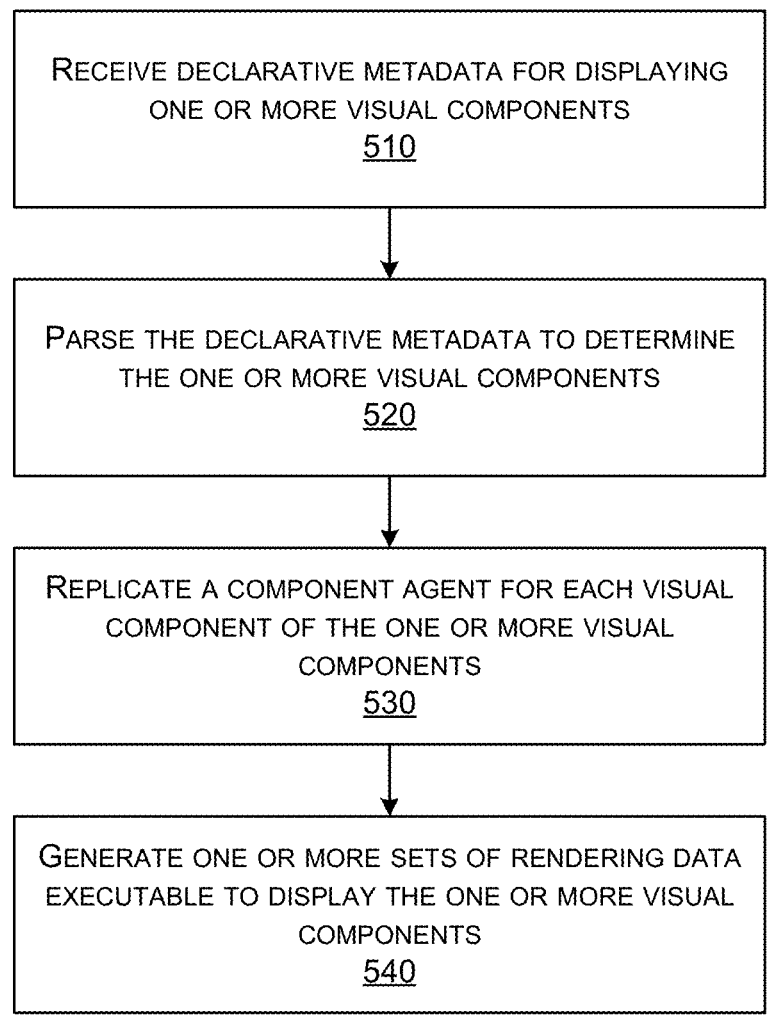
FIG. 5 depicts an example flowchart of a process for interface component generation using a multi-use agent according to certain embodiments of the present disclosure.

FIG. 5 depicts an example flowchart of a process for interface component generation using a multi-use agent according to certain embodiments of the present disclosure. Specifically, FIG. 5 depicts an example flowchart of a process 500 for utilizing a distributed plurality of component agents to generate component renderings for displaying an interface. Process 500 begins at step 510 by receiving declarative metadata for displaying one or more visual components on an interface. The declarative metadata may be received by a multi-use agent as part of a component generation process. For example, a multi-use agent may receive a declarative definition corresponding to a configuration of one or more components that will be displayed on a dashboard interface. The multi-use agent may receive the declarative definition from a separate system, such as a component facilitation system.

In various further embodiments, the declarative metadata comprises static metadata and variable metadata for a particular component, the static metadata corresponding to one or more known aspects of the particular component to be rendered and the variable metadata corresponding to one or more variable aspects of the particular component to be rendered. The one or more variable aspects of the particular component may be aspects unknown to a system generating the declarative metadata and/or aspects which may change during the display duration of the dashboard interface. For example, a dashboard component that tracks a dynamic upload speed of a virtual machine may comprise both static and variable metadata. Static metadata may specify a particular virtual machine which is being tracked. Variable metadata may specify a dynamically updating upload speed of the virtual machine which is periodically updated on the displayed dashboard component. In various embodiments, service data received from a service data subsystem is used to populate the variable metadata during generation of rendering data.

At step 520, the declarative metadata is parsed to determine the one or more visual components. In various embodiments, the declarative metadata is sent to an instance of a multi-use agent which will parse the declarative definition. In various further embodiments, the multi-use agent will parse the metadata to determine one or more subsets of the declarative metadata which correspond to one or more visual components to be displayed on the interface. In various further embodiments, the declarative metadata may be a compilation of one or more declarative data subsets, the one or more declarative data subsets separately parsable by the multi-use agent to determine one or more corresponding visual components to be displayed on an interface.

At step 530, a component agent is replicated for each particular visual component of the one or more visual components to be displayed on the interface. In various embodiments, a components agent is replicated from the original multi-use agent which parsed the declarative metadata. In various embodiments, at least one multi-use agent is replicated for each determined visual component. In various further embodiments, each replicated multi-use agent facilitates generation of a corresponding visual component.

At step 540, one or more sets of rendering data are generated, the rendering data executable to display the one or more visual components. In various embodiments, each of the replicated multi-use agents utilizes at least a subset of the declarative metadata to generate a corresponding subset of rendering data. For example, based on the parsing of the declarative metadata in step 520, one or more subsets of the declarative metadata may received by a particular replicated multi-use agent. Each particular replicated multi-use agent may be delegated a subset of the declarative metadata for generating a corresponding visual component. The particular multi-use agent may use the received subset of the declarative metadata to generate rendering data. For example, a multi-use agent may be receive a subset of declarative metadata describing a visual component to be generated and a portion of service data to populate variable metadata within the subset of declarative metadata. The multi-use agent will utilize the data to generate the corresponding subset of rendering data as a set of rendering data.

The multi-use agent may generate the component based on the subset of declarative metadata and local data from a client device. In various embodiments, in response to receiving the subset of declarative metadata, the replicated multi-use agent may query for and/or retrieve one or more data sets required to generate a component. For example, the multi-use agent may determine, based on received declarative metadata, one or more variable datasets which will complete the declarative definition. The multi-use agent may then retrieve variable data from a local data source, such as local storage subsystem 300, and compiled a complete declarative dataset using the incomplete declarative metadata and the retrieved variable data.

In various embodiments, the multi-use agent may use a complete declarative dataset to generate rendering data for rendering a visual component. The rendering data may be generated data which, when executed causes a component to be rendered for placement in a visual interface. For example, the multi-use agent may take, as an input, a complete declarative dataset, and output rendering data for rendering a component. Generating the rendering data may comprise creating, by the multi-use agent, a mock or facsimile of a component. For example, the multi-use agent may use the complete declarative dataset to generate a temporary representation of a visual component in a computer memory. The temporary representation may include any information which defines a visual component, including position on a digital screen, text, or symbols within the component, dynamically updating fields, etc. The multi-use agent may then use the temporary representation to generate the rendering data for rendering a visual component according to the specifications of the temporary representation. For example, the rendering data may be data executable to create, in a computer memory, a rendered representation of a visual component according to the specifications generated in the temporary representation.

In various embodiments, the generation of the rendering data by the multi-use agent instances may be performed in parallel, meaning each multi-use agent instance may generate a subset of rendering data independently of other multi-use agent instances. In various embodiments, each instance of the multi-use agents is communicative coupled, directly or indirectly, to the other multi-use agent instances. The multi-use agents may then share data through a communication protocol, such as service communication subsystem 330. The sharing of data among the multi-use agent instances greatly improve resource utilization by reducing or removing redundant data procurement processes. For example, a first multi-use agent instance may generate rendering data which is similar to rendering data that a second multi-use agent would generate. The first multi-use agent may send the rendering data to the second multi-use agent to prevent the second multi-use agent from using computing resources to generate the same data. In another example, a first multi-use agent may share data used to generate the rendering data to the second multi-use agent to prevent redundant queries for the same local data.

Figure 6:
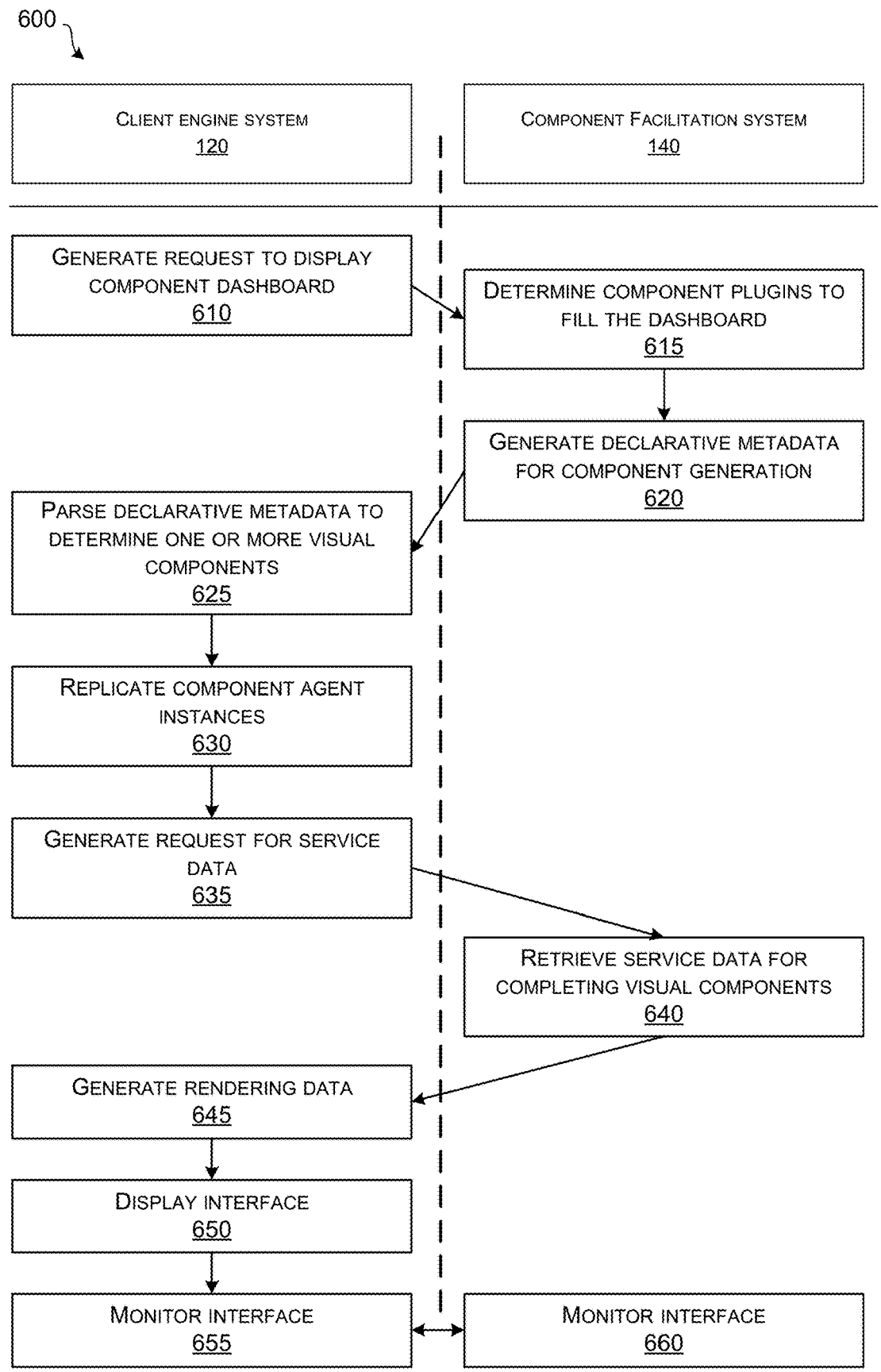
FIG. 6 depicts an example flowchart of a distributed system and process for interface component generation using a multi-use agent according to certain embodiments of the present disclosure.

FIG. 6 depicts an example flowchart of a distributed system and process for interface component generation using a multi-use agent according to certain embodiments of the present disclosure. Specifically, FIG. 6 depicts a distributed system implementing a multi-agent-facilitated process 600 for displaying and monitoring a component interface as part of a client-side rendering configuration of systems. The distributed system comprises a client engine system 120 and a component facilitation system 140 to perform the process 600. The process 600 begins at step 610 when the client engine system 120 generates a request to display a component dashboard. The request to display the component dashboard may come from a client requesting display of a component dashboard on an electronic display of a client device. For example, a customer may use client device 110 executing client engine system 120 to send a request to view a dashboard of components to a service provider's server 130 executing component facilitation system 140. In various embodiments, the request to display the component dashboard comprises a client indicator, the client indicator corresponding to a stored dashboard configuration. In various embodiments, the request to display the component dashboard comprises a component manifest listing a number of desired components for display on a dashboard.

At step 615, the component facilitation system 140 receives the request from the client engine system 120 and determines component plugins to fill the requested dashboard. The component facilitation system 140 may utilize a client-specific component manifest to determine the components plugins for filling the requested dashboard. In various embodiments, the manifest may be received from the client engine system 120 as part of the request to display the component dashboard. In various embodiments, component facilitation system 140 stores a component manifest in internal memory and retrieves the manifest based on a dashboard indicator received from the client engine system 123. Based on the manifest, one or more plugins may be identified. A plugin may be a software package containing one or more component definitions or functionalities. A number of plugins may be stored on the internal memory or accessible by the internal memory of the component facilitation system 140. The plugins may correspond to declarative data for rendering a component on a dashboard interface.

At step 620, based on the determine component plugins, the component facilitation system 140 generates declarative metadata for component generation. The declarative metadata may be generated based on declarative data taken from the determined component plugins or a from a computer memory storing declarative data based on the determine component plugins. For example, based on the component manifest, one or more sets of declarative data taken from the component plugins may be combined to form a set of declarative metadata. The declarative metadata may comprise one or more sets of static metadata and one or more sets of variable metadata for generating client-specific visual components.

At step 625, the client engine system 120 receives the declarative metadata from the component facilitation system 140 and parses the declarative metadata to determine one or more visual components. This may be similar to steps 510 and 520 in process 500. At step 630, based on the determined one or more visual components, the client engine system 120 replicates a component agent into one or more instances of a component agent. This may be similar to step 530 described in process 500. At step 635, the client engine system 120 generates a request for service data that will be used for facilitating the dashboard interface. The request is sent to component facilitation system 140, which tracks and records metrics relating to performance of the services.

At step 640, the component facilitation system 140 retrieves the service data for completing the visual components. The component facilitation system 140 may use the request generated in block 635 to identify services executing at a service provider system and extract metric data to be sent to client engine system 120.

At step 645, the client engine system 120 receives the service data from component facilitation system 140 and generates rendering data for rendering complete components on a dashboard interface. For example, client engine system 120 and the multi-use agents replicated therein may use the declarative metadata and the service data to compile one or more instances of complete components and generate rendering data for the complete components.

At step 650, the client engine system 120 utilizes the generated rendering data to display the interface comprising the component dashboard. In various embodiments, the client engine system 120 has previously received a shell dashboard which will be populated with the dashboard interface. The shell dashboard is populated in real-time with interface data as it is generated. For example, the component facilitation system 140 may generate one or more sets of interface data in parallel as the rendering data is generated by the client engine system 120 in a client-side rendering configuration. In a server-side rendering configuration, the dashboard components are displayed as they are received from component facilitation system 140 and executed by client engine system 120.

At step 655, the client engine system 120 monitors the displayed interface in real-time to determine any changes or interactions with the interface. Monitoring the interface in real-time may allow for real-time updates to the interface. For example, the client engine system 120 may monitor the interface to detect user interactions with the interface. The user interactions may cause an update of a particular component on the dashboard. The client engine system 120 may, in response to determining the interaction, cause an update of the component. For example, if an interaction with the interface would cause a widget component to update, the component engine may interact with the component facilitation system 140 to cause regeneration or updating of the components. At step 660, the component facilitation system 140 monitors the displayed interface in real-time concurrently with the client engine system 120 to determine any changes or interactions with the components. By monitoring the interface at the same time, both systems may act responsive to interactions with the interface instead of in response to communications with the other system.

Figure 7:
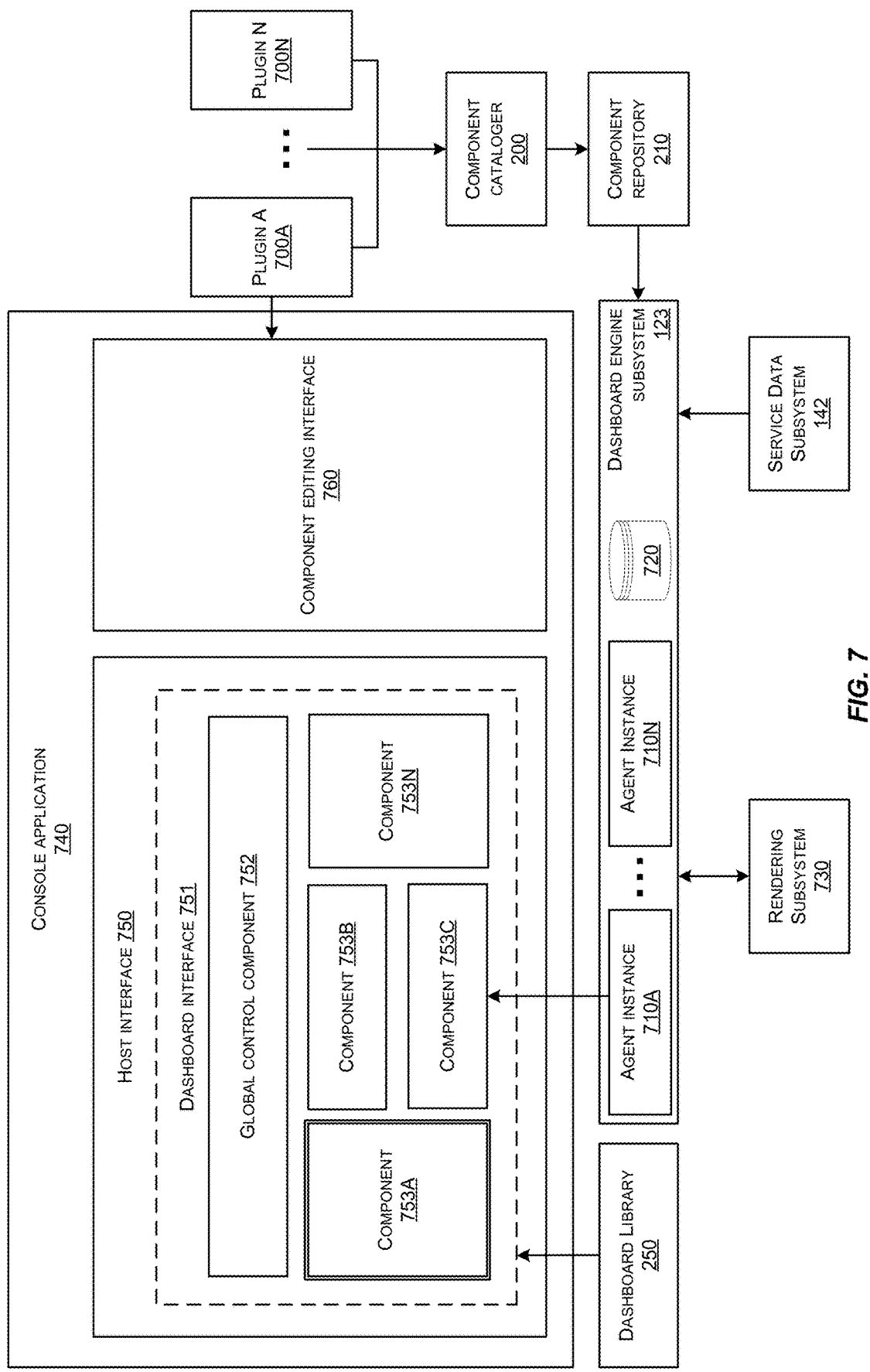
FIG. 7 is a block diagram of a distributed system including a dashboard library and dashboard engine for generating an interface according to certain embodiments of the present disclosure.

FIG. 7 is a block diagram of a distributed system including a dashboard library and dashboard engine for generating an interface according to certain embodiments of the present disclosure. Specifically, FIG. 7 depicts a block diagram of an example interface structure and entities facilitating the display of the interface. The block diagram shown in FIG. 7 may depict a descriptive flow for creating a dashboard interface according to the embodiments described herein. As depicted in FIG. 7, a number of plugins 700A-700N exist, which comprise data and/or information related to components that may be displayed on a dashboard interface.

The plugins 700A-700N are communicatively coupled to a component cataloger 200, which receives data from the plugins 700A-700N to generate a component catalog for implementing an interface. The component catalog may be created using the plugins 700A-700N and some manifest of components for display, such as a manifest received from a client device as part of a dashboard request. The component cataloger 200 may be communicatively coupled to a component repository 210, which receives the component catalog and retrieves one or more component datasets corresponding to the component catalog. The retrieved one or more component datasets may be compiled into declarative metadata. The declarative metadata may comprise some static data, which is taken directly from the plugins, and fields for variable data, which will be filled by local data stored at a client device. In various embodiments, each of the previously described entities may be stored at a component facilitation system.

The component repository 210 may be communicatively coupled to a dashboard engine subsystem 123, which receives declarative metadata from the one or more retrieved components. The dashboard engine subsystem 123 may be stored at a client engine system which is separate from the aforementioned component facilitation system. The dashboard engine subsystem 123 may be configured to utilized declarative metadata from the component repository 210 to cause generation of one or more components.

The dashboard subsystem 123 may comprise one or more agent instances 710A-710N. The one or more agent instances may be multi-use agents which are capable of parsing declarative metadata, replicating, and generating rendering data for components. The dashboard subsystem 123 may further comprise storage 720. Storage 720 may be a storage which comprises data for generating instances of a multi-use agent 710. Storage 720 may be a local storage, such as local storage subsystem 300 which contains local data for supplementing incomplete declarative metadata. For example, an agent instance 710 may parse incoming declarative metadata and determine to replicate agent instances 710A-710N. Each of agent instances 710A-710N may be delegated a component for rendering. Each individual agent instance 710 may supplement a subset of the declarative metadata with local data from storage 720 to create a set of complete declarative data. The agent instance may then generate rendering data based on the complete declarative data.

The dashboard subsystem 123 may be communicatively coupled to one or more rendering subsystems 730. The one or more rendering subsystems 730 may be internal or external services for facilitating the generation of one or more dashboard components. For example, a rendering subsystem may be an external rendering subsystem such as rendering subsystem 260 of component facilitation system 140 operable as part of a server-side rendering configuration. In various embodiments incorporating client-side rendering configurations, rendering is performed by the agent instances 710A-710N of dashboard engine subsystem 123.

The dashboard subsystem 123 may be communicatively coupled to a service data subsystem 142. The service data subsystem 142 may send service data to dashboard engine subsystem 123 to complete declarative metadata received by dashboard engine subsystem 123 to form a complete component. For example, a service may be executing on a client's behalf independent of the dashboard display process to host a virtual machine for the client's customers. The service may be queried to retrieve, and responsively send back to the dashboard engine subsystem 123, service data for filling the fields. In the example, above, the virtual machine service may send information such as current upload speed of the virtual machine, download speed, maintenance status, etc.

A dashboard library 250 may store one or more dashboard configurations for instantiating a dashboard interface. The dashboard library 250 may contain information related to one or more custom modular dashboard configurations associated with a client or user. In various embodiments, without restrictions and in parallel to any of the processes previously described, the dashboard library 250 may receive data related to a request to display a particular client's dashboard or an updated client dashboard. Dashboard library 250 may then begin generation of a dashboard interface shell to be populated by the generated one or more components. Dashboard library 250 may be communicatively coupled to a console application 740 executing on a client device that will host the dashboard interface. The dashboard library 250 may send data to the console application 740 comprising a dashboard shell corresponding to a particular customer. In response, console application 740 may cause generating, on a host interface 750 of the console application that is visible to a user via an electronic display, a dashboard interface 751.

The dashboard interface 751 may be populated by components 753 as they become available and are displayed by executing display data.

In this manner, the dashboard library 26=50 and the agent instances 710A-710N may be utilized to generate the dashboard interface 751 on the host interface 750 of the console application 740. In various embodiments, shell components are placed on dashboard interface 751 while the component generation process in pending to indicate to a client that one or more components are to be placed on the dashboard interface 751 in the future. Dashboard interface 751 may further comprise global control component 752. Global control component 752 may be a separate component which is inherently part of the dashboard interface 751 without requiring component generation. Global control component 752 may be a component with which a client may interface to cause some aspect of the dashboard interface to change. For example, global control component 752 may change one or more visual aspects of the dashboard interface, such as a brightness level, shading level, etc. In another example, global control component 752 may change one or more functional aspects of the dashboard interface, such as an input protocol, an update protocol, etc.

Components 753A-753N may be displayed on dashboard interface 751 as they are generated. For example, a first component may be rendered before a second component. The first component may then be displayed on dashboard interface before the second component, while the second component is still undergoing rendering. Components 753A-753N may be interactive components. Interactive components may change in some way or cause some functionality to execute when interaction with the component is detected. For example, as depicted in FIG. 7, component 753A is highlighted with a border indicating that a client has interacted with component 753A using a digital interface. The agent instances 710A-710N may actively monitor and update their corresponding components in real-time using local data accessible by the dashboard engine subsystem 123.

In various embodiments, console application 740 may further comprise component editing interface 760. Component editing interface 760 may be an interface through which a client may change some aspect of a current component 753 or create a new component. Component editing interface 760 may be interactive in real-time, meaning declarative metadata may be generated and edited in real time as a client interacts with the component through component editing interface 760. For example, as depicted in FIG. 7, plugin A 700A may contain some data related to a function of a component being editing in component editing interface 760. Data may be taken and/or converted from plugin A 700A in real-time to generate a facsimile of a component in component editing interface 700.

Figure 8:
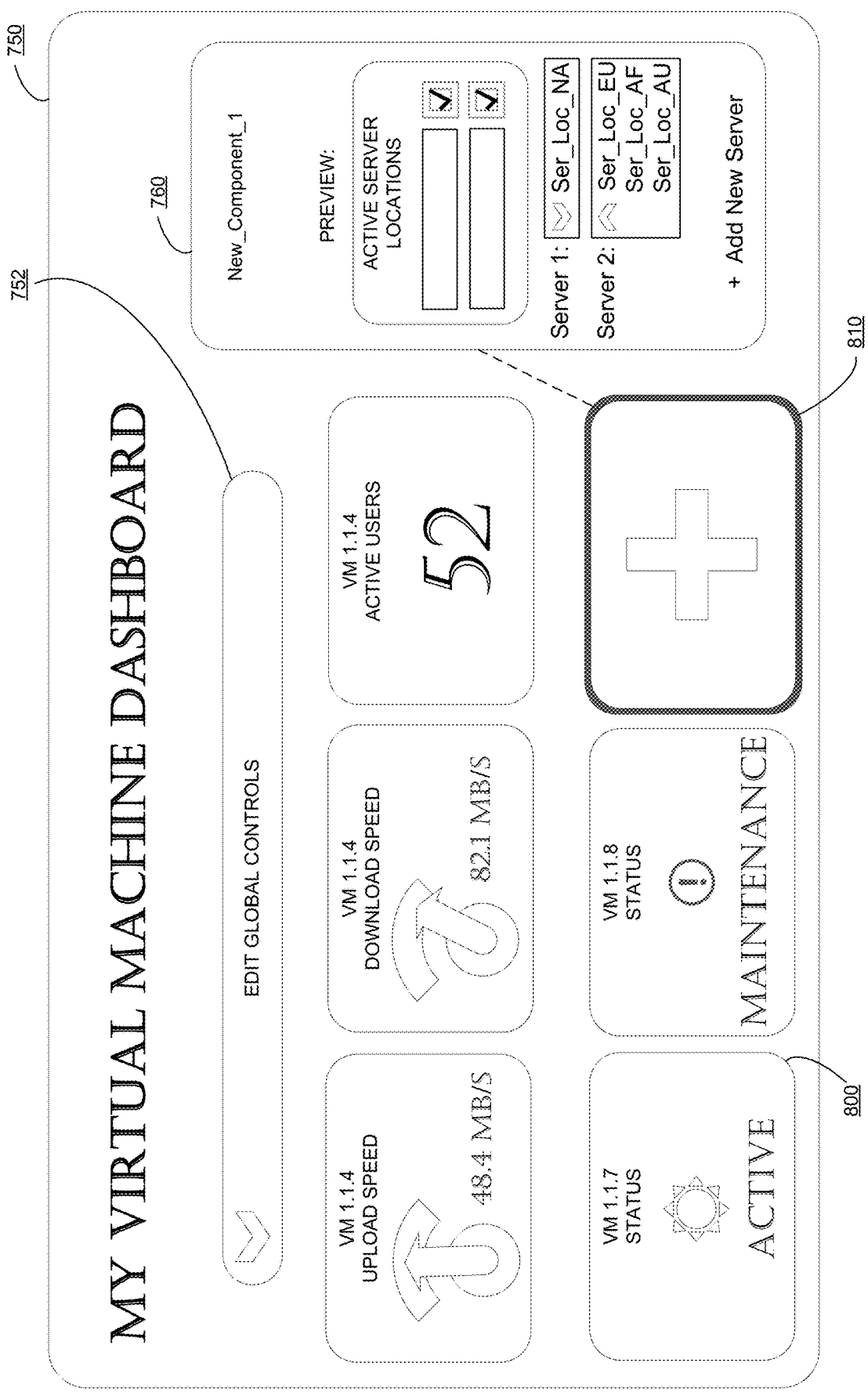
FIG. 8 depicts an example graphical interface for component utilisation according to certain embodiments of the present disclosure.

FIG. 8 depicts an example graphical interface for component utilisation according to certain embodiments of the present disclosure. Specifically, FIG. 8 depicts an example dashboard interface generated according to the embodiment described herein. As depicted in FIG. 8, a host interface 750 may display a component dashboard populated by a number of components. The host interface 750 may comprise a global control component 752. The host interface 750 may comprise a number of visual components such as component 800. Component 800, as depicted in FIG. 8, is a widget-style component displaying an operation status of a virtual machine.

The host interface 750 may further comprise a new component 810. New component 810 may be a placeholder component for creating a new component on host interface 750. For example, by interactive with new component 810 on the digital display, a new component editing process may begin. The new component editing process may comprise an initiation of component editing interface 760 for the new component 810. As depicted in FIG. 8, component editing interface 760 may execute and display to a client options for generating a new component. For example, as depicted in FIG. 8, the potential new component may be an ACTIVE SERVER LOCATIONS widget-component for displaying active server locations. The potential new component is displayed as a facsimile of a generated component according to declarative metadata that corresponds to the potential new widget. For example, the facsimile contains static data such as a title and a location of several fields of information on the component, and variable data such as a few servers which will be the subject of the displayed information which a client may specify.

An example embodiment is described below for implementing the interface depicted in FIG. 8. A user of a client device 110 implementing client engine system 120 on which the interface may be displayed may specify display of the dashboard "MY VIRTUAL MACHINE DASHBOARD." The user may interact with new component 810 to request creation of a new component through editing interface 760. In response to detecting the interaction with new component 810, the client engine system 120 may query a catalog subsystem 141 of a component facilitation system 140 to retrieve and send a listing of cataloged components. One such component from the cataloged components may be displayed as a facsimile component on component editing interface 760.

Once a user has specified creation of new component 810, client engine system may send dashboard data corresponding to the new configuration to a dashboard creation subsystem 143 of component facilitation system 140. The dashboard creation subsystem 143 parses the dashboard data and accesses a number of plugins 700 to retrieve declarative metadata relating to the new dashboard configuration. The dashboard creation subsystem 143 may then send the declarative metadata to client engine system 120. Client engine system 120 may utilize a multi-use agent to parse the declarative definition and cause replication for the multi-use agent for a number of components to be display as part of "MY VIRTUAL MACHINE DASHBOARD." Some of the multi-use agents may query a service data subsystem 142 of component facilitation system 140 to retrieve service data related to the components to be displayed. For example, a particular multi-use agent corresponding to new component 810 may query service data subsystem 142 for service data related to a server status of servers operated by a service provider and utilized by the client. The service data subsystem 142 may send this information back to the particular multi-use agent.

The multi-use agents may use the declarative definition received from the dashboard creation subsystem 143 and the service data received from service data subsystem 142 to generate rendering data for the components to be displayed on the dashboard interface. The rendering data may then be executed to populate a shell interface and display the interface depicted in FIG. 8.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
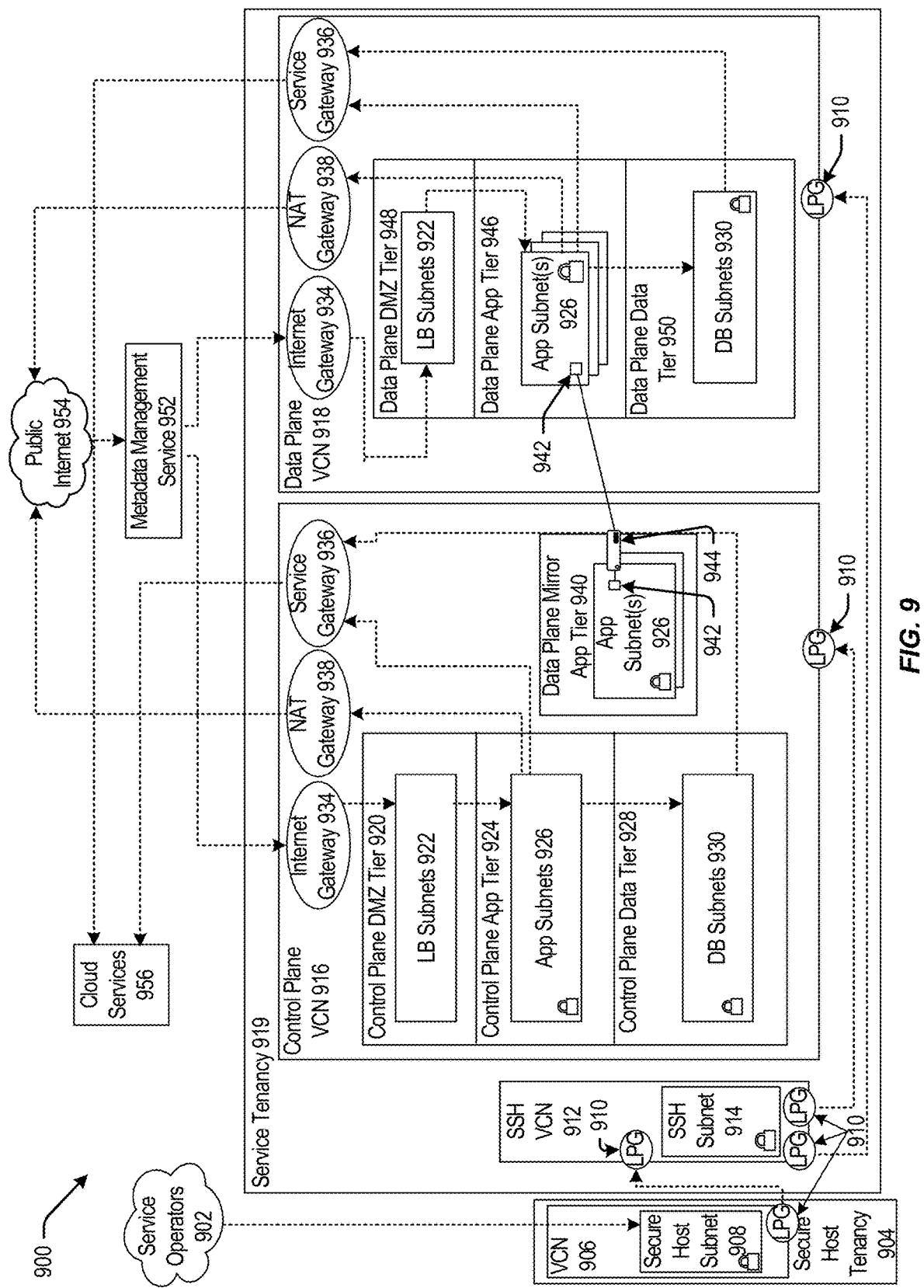
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers, and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Memory that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
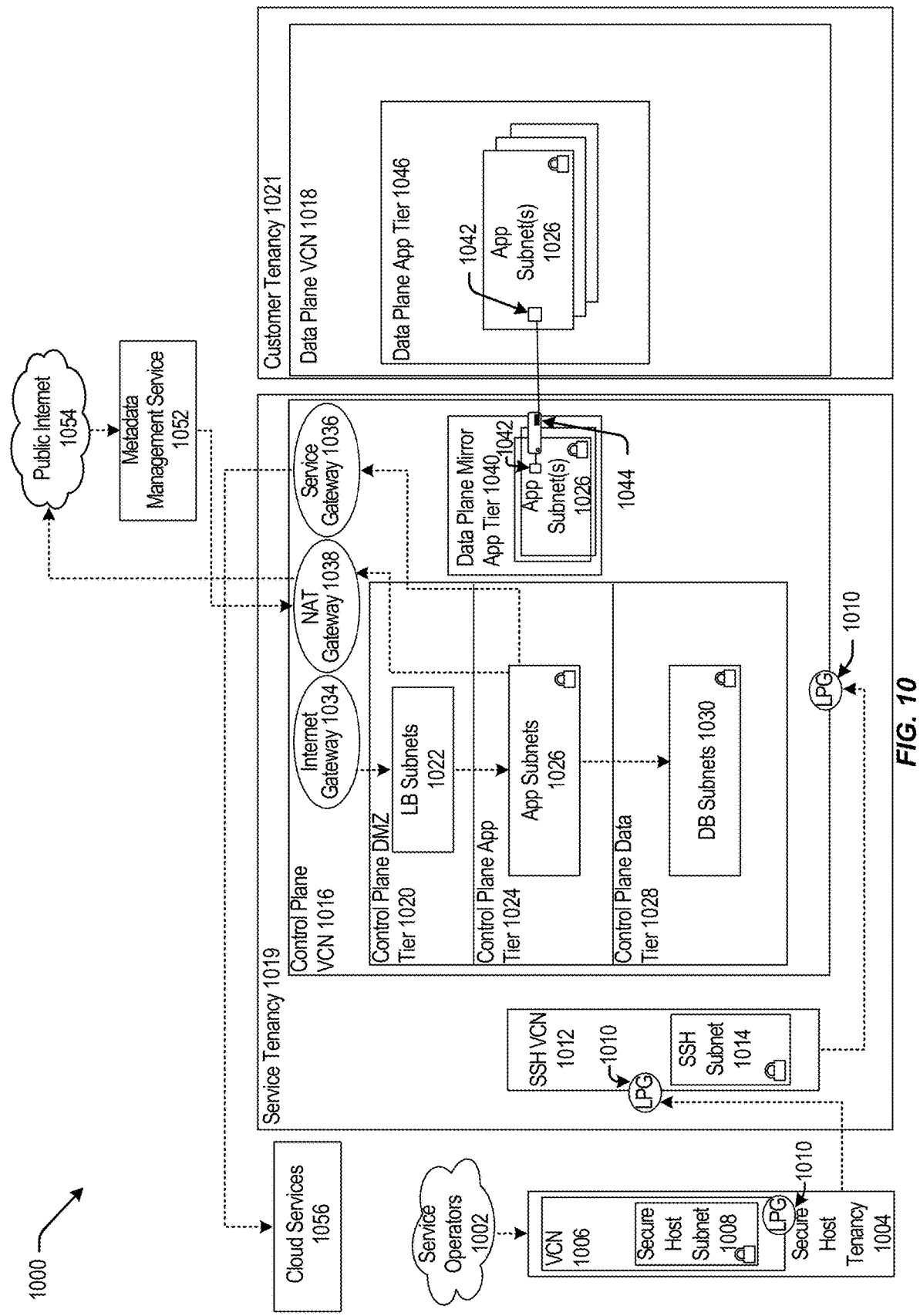
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 902 of FIG. 9) can be communicatively coupled to a secure host tenancy 1004 (e.g. the secure host tenancy 904 of FIG. 9) that can include a virtual cloud network (VCN) 1006 (e.g. the VCN 906 of FIG. 9) and a secure host subnet 1008 (e.g. the secure host subnet 908 of FIG. 9). The VCN 1006 can include a local peering gateway (LPG) 1010 (e.g. the LPG 910 of FIG. 9) that can be communicatively coupled to a secure shell (SSH) VCN 1012 (e.g. the SSH VCN 912 of FIG. 9) via an LPG 910 contained in the SSH VCN 1012. The SSH VCN 1012 can include an SSH subnet 1014 (e.g. the SSH subnet 914 of FIG. 9), and the SSH VCN 1012 can be communicatively coupled to a control plane VCN 1016 (e.g. the control plane VCN 916 of FIG. 9) via an LPG 1010 contained in the control plane VCN 1016. The control plane VCN 1016 can be contained in a service tenancy 1019 (e.g. the service tenancy 919 of FIG. 9), and the data plane VCN 1018 (e.g. the data plane VCN 918 of FIG. 9) can be contained in a customer tenancy 1021 that may be owned or operated by users, or customers, of the system.

The control plane VCN 1016 can include a control plane DMZ tier 1020 (e.g. the control plane DMZ tier 920 of FIG. 9) that can include LB subnet(s) 1022 (e.g. LB subnet(s) 922 of FIG. 9), a control plane app tier 1024 (e.g. the control plane app tier 924 of FIG. 9) that can include app subnet(s) 1026 (e.g. app subnet(s) 926 of FIG. 9), a control plane data tier 1028 (e.g. the control plane data tier 928 of FIG. 9) that can include database (DB) subnet(s) 1030 (e.g. similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g. the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g. the service gateway of FIG. 9) and a network address translation (NAT) gateway 1038 (e.g. the NAT gateway 938 of FIG. 9). The control plane VCN 1016 can include the service gateway 1036 and the NAT gateway 1038.

The control plane VCN 1016 can include a data plane mirror app tier 1040 (e.g. the data plane mirror app tier 940 of FIG. 9) that can include app subnet(s) 1026. The app subnet(s) 1026 contained in the data plane mirror app tier 1040 can include a virtual network interface controller (VNIC) 1042 (e.g. the VNIC of 942) that can execute a compute instance 1044 (e.g. similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g. the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g. the metadata management service 952 of FIG. 9) that can be communicatively coupled to public Internet 1054 (e.g. public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g. cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 6," may be located in Region 1 and in "Region 2." If a call to Deployment 6 is made by the service gateway 1036 contained in the control plane VCN 1016 located in Region 1, the call may be transmitted to Deployment 6 in Region 1. In this example, the control plane VCN 1016, or Deployment 6 in Region 1, may not be communicatively coupled to, or otherwise in communication with, Deployment 6 in Region 2.

Figure 11:
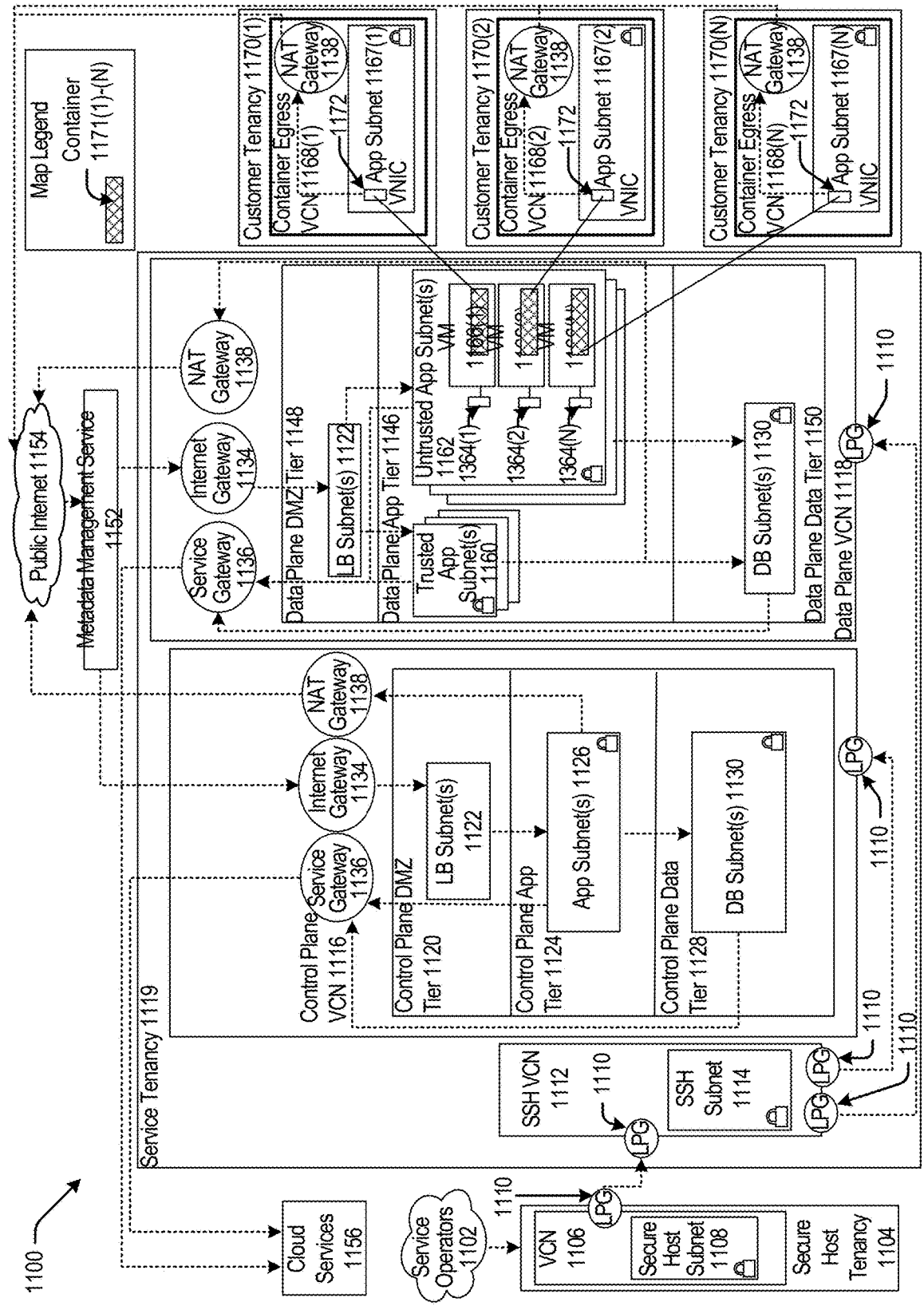
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 902 of FIG. 9) can be communicatively coupled to a secure host tenancy 1104 (e.g. the secure host tenancy 904 of FIG. 9) that can include a virtual cloud network (VCN) 1106 (e.g. the VCN 906 of FIG. 9) and a secure host subnet 1108 (e.g. the secure host subnet 908 of FIG. 9). The VCN 1106 can include an LPG 1110 (e.g. the LPG 910 of FIG. 9) that can be communicatively coupled to an SSH VCN 1112 (e.g. the SSH VCN 912 of FIG. 9) via an LPG 1110 contained in the SSH VCN 1112. The SSH VCN 1112 can include an SSH subnet 1114 (e.g. the SSH subnet 914 of FIG. 9), and the SSH VCN 1112 can be communicatively coupled to a control plane VCN 1116 (e.g. the control plane VCN 916 of FIG. 9) via an LPG 1110 contained in the control plane VCN 1116 and to a data plane VCN 1118 (e.g. the data plane 918 of FIG. 9) via an LPG 1110 contained in the data plane VCN 1118. The control plane VCN 1116 and the data plane VCN 1118 can be contained in a service tenancy 1119 (e.g. the service tenancy 919 of FIG. 9).

The control plane VCN 1116 can include a control plane DMZ tier 1120 (e.g. the control plane DMZ tier 920 of FIG. 9) that can include load balancer (LB) subnet(s) 1122 (e.g. LB subnet(s) 922 of FIG. 9), a control plane app tier 1124 (e.g. the control plane app tier 924 of FIG. 9) that can include app subnet(s) 1126 (e.g. similar to app subnet(s) 926 of FIG. 9), a control plane data tier 1128 (e.g. the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 9) and a network address translation (NAT) gateway 1138 (e.g. the NAT gateway 938 of FIG. 9). The control plane VCN 1116 can include the service gateway 1136 and the NAT gateway 1138.

The data plane VCN 1118 can include a data plane app tier 1146 (e.g. the data plane app tier 946 of FIG. 9), a data plane DMZ tier 1148 (e.g. the data plane DMZ tier 948 of FIG. 9), and a data plane data tier 1150 (e.g. the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g. public Internet 954 of FIG. 9).

The Internet gateway 1134 contained in the control plane VCN 1116 and contained in the data plane VCN 1118 can be communicatively coupled to a metadata management service 1152 (e.g. the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
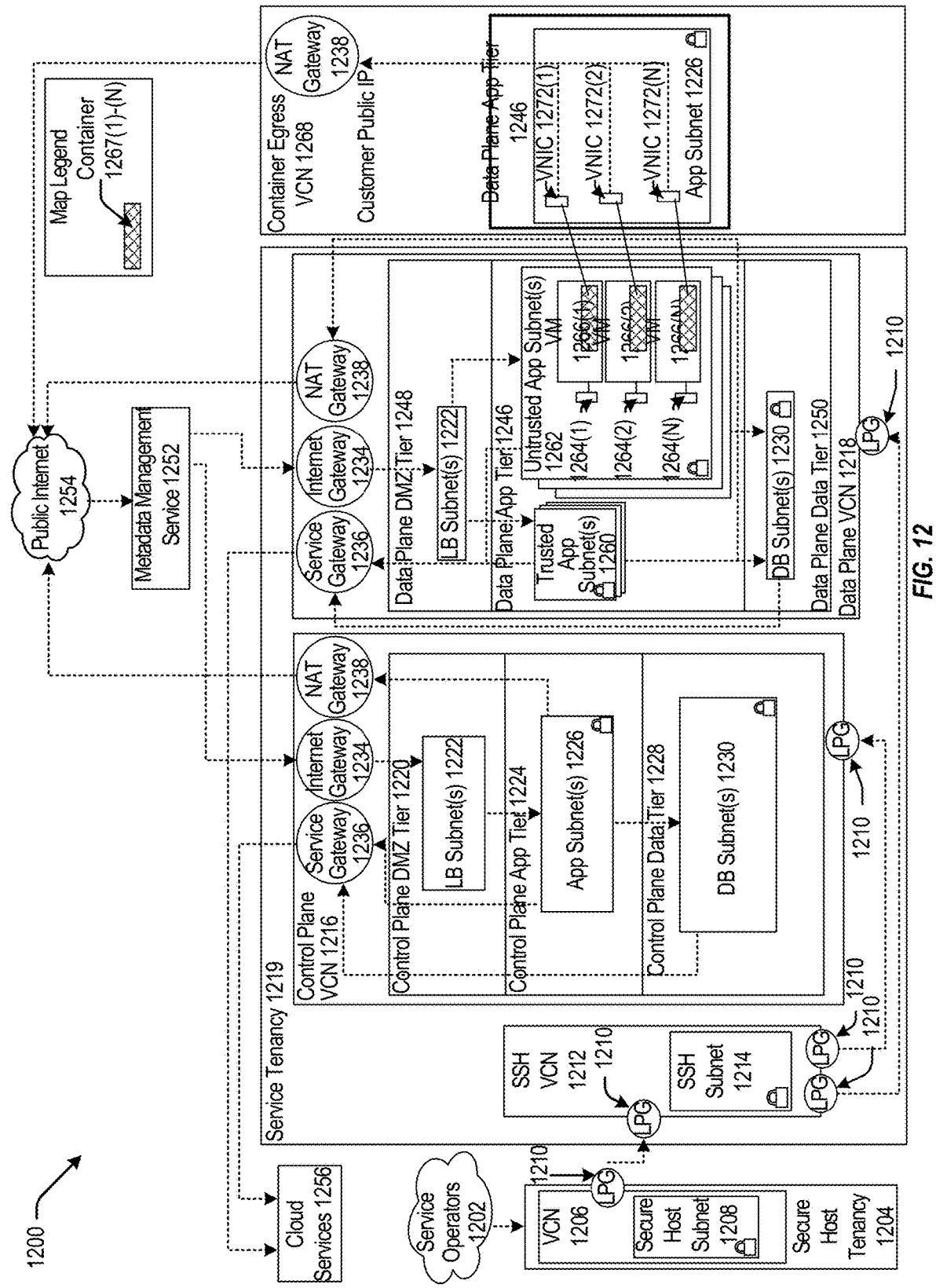
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 902 of FIG. 9) can be communicatively coupled to a secure host tenancy 1204 (e.g. the secure host tenancy 904 of FIG. 9) that can include a virtual cloud network (VCN) 1206 (e.g. the VCN 906 of FIG. 9) and a secure host subnet 1208 (e.g. the secure host subnet 908 of FIG. 9). The VCN 1206 can include an LPG 1210 (e.g. the LPG 910 of FIG. 9) that can be communicatively coupled to an SSH VCN 1212 (e.g. the SSH VCN 912 of FIG. 9) via an LPG 1210 contained in the SSH VCN 1212. The SSH VCN 1212 can include an SSH subnet 1214 (e.g. the SSH subnet 914 of FIG. 9), and the SSH VCN 1212 can be communicatively coupled to a control plane VCN 1216 (e.g. the control plane VCN 916 of FIG. 9) via an LPG 1210 contained in the control plane VCN 1216 and to a data plane VCN 1218 (e.g. the data plane 918 of FIG. 9) via an LPG 1210 contained in the data plane VCN 1218. The control plane VCN 1216 and the data plane VCN 1218 can be contained in a service tenancy 1219 (e.g. the service tenancy 919 of FIG. 9).

The control plane VCN 1016 can include a control plane DMZ tier 1220 (e.g. the control plane DMZ tier 920 of FIG. 9) that can include LB subnet(s) 1222 (e.g. LB subnet(s) 922 of FIG. 9), a control plane app tier 1224 (e.g. the control plane app tier 924 of FIG. 9) that can include app subnet(s) 1226 (e.g. app subnet(s) 926 of FIG. 9), a control plane data tier 1228 (e.g. the control plane data tier 928 of FIG. 9) that can include DB subnet(s) 1230 (e.g. DB subnet(s) 1030 of FIG. 10). The LB subnet(s) 1222 contained in the control plane DMZ tier 1220 can be communicatively coupled to the app subnet(s) 1226 contained in the control plane app tier 1224 and to an Internet gateway 1234 (e.g. the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g. the service gateway of FIG. 9) and a network address translation (NAT) gateway 1238 (e.g. the NAT gateway 938 of FIG. 9). The control plane VCN 1216 can include the service gateway 1236 and the NAT gateway 1238.

The data plane VCN 1218 can include a data plane app tier 1246 (e.g. the data plane app tier 946 of FIG. 9), a data plane DMZ tier 1248 (e.g. the data plane DMZ tier 948 of FIG. 9), and a data plane data tier 1250 (e.g. the data plane data tier 950 of FIG. 9). The data plane DMZ tier 1248 can include LB subnet(s) 1222 that can be communicatively coupled to trusted app subnet(s) 1260 (e.g. trusted app subnet(s) 1060 of FIG. 10) and untrusted app subnet(s) 1262 (e.g. untrusted app subnet(s) 1062 of FIG. 10) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g. public Internet 954 of FIG. 9).

The Internet gateway 1234 contained in the control plane VCN 1216 and contained in the data plane VCN 1218 can be communicatively coupled to a metadata management service 1252 (e.g. the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
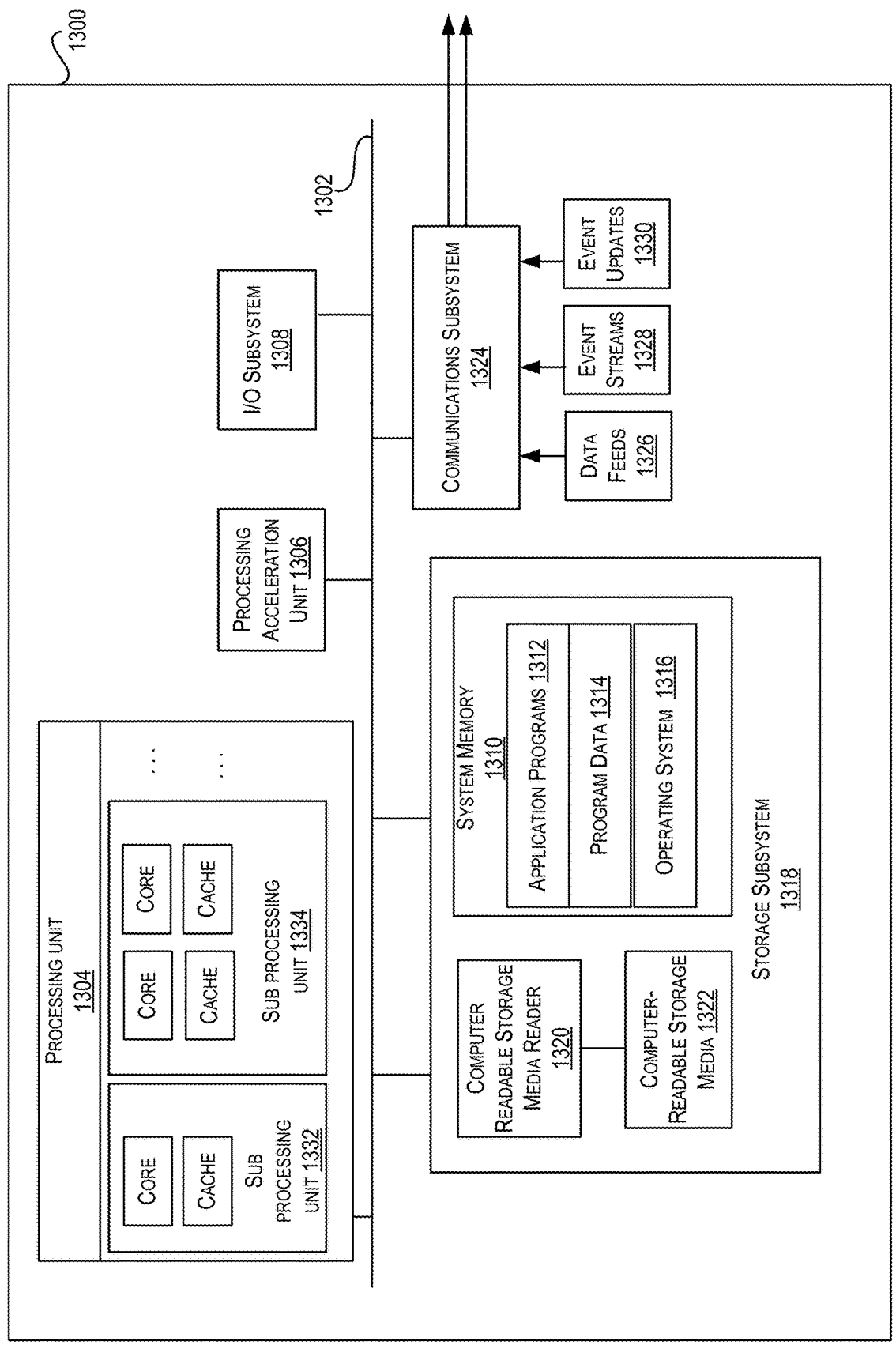
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present disclosure.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    receiving, by a client device, declarative metadata, at least a portion of the declarative metadata corresponding to one or more visual components to be displayed on an interface;
    parsing, by the client device, the declarative metadata to determine the one or more visual components;
    replicating, by the client device, a component agent for each visual component of the one or more visual components to create a plurality of component agents;
    generating, by the client device, one or more sets of rendering data, each set of the one or more sets of rendering data generated by a respective component agent of the plurality of component agents and is corresponding to a particular visual component of the one or more visual components, wherein at least one respective component agent of the plurality of component agents shares rendering data directly with at least one other component agent in the plurality of component agents through a direct communication; and
    rendering, by the client device, the one or more visual components.

2. The method of claim 1, further comprising executing the one or more sets of rendering data to cause displaying the one or more visual components on the interface.

3. The method of claim 2, further comprising:
determining, based at least in part on the declarative metadata, one or more interaction responses corresponding to the one or more visual components;
detecting input corresponding to an interaction with the displayed one or more visual components on the interface; and
in response, causing performance of the one or more interaction responses.

4. The method of claim 3, wherein the one or more interaction responses comprise at least a component update response causing an update of at least a displayed visual component of the displayed one or more visual components by updating at least a set of rendering data of the one or more sets of rendering data.

5. The method of claim 1, wherein the component agent parses the declarative metadata to determine a number of component agents that will be replicated to create the plurality of component agents.

6. The method of claim 5, further comprising, in response to receiving the declarative metadata, retrieving the component agent from a computer memory.

7. The method of claim 1, further comprising sending, from a first component agent of the plurality of component agents to a second component agent of the plurality of component agents, at least a portion of a first set of rendering data generated by the first component agent, wherein a second set of rendering data generated by the second component agent is generated based at least in part on the portion of the first set of rendering data sent by the first component agent.

8. The method of claim 1, wherein the declarative metadata for displaying the one or more visual components on the interface corresponds to dashboard data representing a particular configuration of the one or more visual components within a dashboard interface.

9. The method of claim 8, further comprising:
receiving, by the client device, a list that includes at least the one or more visual components;
receiving, by the client device, a selection of the one or more visual components from the list; and
generating, by the client device, the dashboard data based at least in part on the selection of the one or more visual components, wherein a server device is configured to concurrently generate the declarative metadata based at least in part on the dashboard data.

10. The method of claim 1, further comprising:
detecting, by the client device, an update to the one or more visual components, wherein a server device is configured to concurrently, and
in response to detecting the update to the one or more visual components by the client device, generate updated declarative metadata, and wherein at least a part of the updated declarative metadata corresponding to one or more updated visual components is to be displayed on the interface.

11. The method of claim 10, wherein:
the plurality of component agents are implemented by the client device;
the updated declarative metadata is configured to be generated by the server device; and
the method further comprises:
monitoring, by the client device, the one or more visual components to detect the update to the one or more visual components, wherein the server device is configured to concurrently monitor the one or more visual components to detect the update;
in response to detecting, by the client device, the update to the one or more visual components, at the client device, sending, to the server device, input data; and
receiving, by the client device from the server device, the updated declarative metadata.

12. The method of claim 1, further comprising receiving service data, the service data corresponding to one or more metrics for one or more services related to the one or more visual components, wherein the one or more sets of rendering data are generated based at least in part on the declarative meta data and the service data.

13. A non-transitory computer-readable storage medium storing a plurality of instructions executable by one or more processors of a client device, the plurality of instructions when executed by the one or more processors of the client device cause the one or more processors to perform operations comprising:
receiving declarative metadata, at least a portion of the declarative metadata corresponding to one or more visual components to be displayed on an interface;
parsing the declarative metadata to determine the one or more visual components;
replicating a component agent for each visual component of the one or more visual components to create a plurality of component agents;
generating one or more sets of rendering data, each set of the one or more sets of rendering data generated by a respective component agent of the plurality of component agents and is corresponding to a particular visual component of the one or more visual components, wherein at least one respective component agent of the plurality of component agents shares rendering data directly with at least one other component agent in the plurality of component agents through a direct communication; and
rendering the one or more visual components.

14. The non-transitory computer-readable storage medium storing the plurality of instructions executable by the one or more processors of claim 13, further comprising instructions which, when executed by the one or more processors, cause executing the one or more sets of rendering data to cause displaying the one or more visual components on the interface.

15. The non-transitory computer-readable storage medium storing the plurality of instructions executable by the one or more processors of claim 14, further comprising instructions which, when executed by the one or more processors, cause:
determining, based at least in part on the declarative metadata, one or more interaction responses corresponding to the one or more visual components;
detecting input corresponding to an interaction with the displayed one or more visual components on the interface; and
in response, causing performance of the one or more interaction responses.

16. The non-transitory computer-readable storage medium storing the plurality of instructions executable by the one or more processors of claim 13, wherein the component agent parses the declarative metadata to determine a number of component agents that will be replicated to create the plurality of component agents, and further comprising instructions which, when executed by the one or more processors, cause in response to receiving the declarative metadata, retrieving the component agent from a computer memory.

17. The non-transitory computer-readable storage medium of claim 13, further comprising instructions which, when executed by the one or more processors, cause:
   detecting an update to the one or more visual components; and
   in response to detecting the update to the one or more visual components, generating updated declarative metadata, at least a part of the updated declarative metadata corresponding to one or more updated visual components to be displayed on the interface.

18. The non-transitory computer-readable storage medium of claim 17, wherein:
   the plurality of component agents are implemented by the client device;
   the updated declarative metadata is configured to be generated by a server device; and
   further comprising instructions which, when executed by the one or more processors, cause:
      monitoring, by the client device, the one or more visual components to detect the update to the one or more visual components, wherein the server device is configured to concurrently monitor the one or more visual components to detect the update;
      in response to detecting, by the client device, the update to the one or more visual components, at the client device, sending, to the server device, input data; and
      receiving, by the client device from the server device, the updated declarative metadata.

19. A client device implementing a visual component generation system, comprising:
   one or more data processors; and
   a non-transitory computer-readable storage medium comprising instructions which, when executed on the one or more data processors, cause the one or more data processors to perform operations including:
      receiving declarative metadata, at least a portion of the declarative metadata corresponding to one or more visual components to be displayed on an interface;
      parsing, by a component agent, the declarative metadata to determine the one or more visual components;
      replicating the component agent for each visual component of the one or more visual components to create a plurality of component agents;
      generating one or more sets of rendering data, each set of the one or more sets of rendering data generated by a respective component agent of the plurality of component agents and is corresponding to a particular visual component of the one or more visual components, wherein at least one respective component agent of the plurality of component agents shares rendering data directly with at least one other component agent in the plurality of component agents through a direct communication; and
      rendering the one or more visual components.

20. The client device of claim 19, wherein:
   the plurality of component agents are implemented by the client device;
   updated declarative metadata is configured to be generated by a server device; and
   further comprising instructions which, when executed by the one or more processors, cause:
      monitoring, by the client device, the one or more visual components to detect an update to the one or more visual components, wherein the server device is configured to concurrently monitor the one or more visual components to detect the update;
      in response to detecting, by the client device, the update to the one or more visual components, at the client device, sending, to the server device, input data; and
      receiving, by the client device from the server device, the updated declarative metadata.

* * * * *

UNITED STATES PATENT AND TRADEMARK OFFICE
CERTIFICATE OF CORRECTION

| | |
|---|---|
| PATENT NO. | : 11,949,761 B2 |
| APPLICATION NO. | : 17/389116 |
| DATED | : April 2, 2024 |
| INVENTOR(S) | : Mata Rodriguez et al. |

It is certified that error appears in the above-identified patent and that said Letters Patent is hereby corrected as shown below:

On the Title Page

On page 2, Column 2, item (56) under Other Publications, Line 33, delete "Overlow," and insert -- Overflow, --, therefor.

On page 2, Column 2, item (56) under Other Publications, Line 52, delete "volumn" and insert -- volume --, therefor.

In the Specification

In Column 3, Line 54, delete "utilisation" and insert -- utilization --, therefor.

In Column 5, Line 5, delete "twice." and insert -- twice, --, therefor.

In Column 8, Line 5, delete "For Information".

In Column 10, Line 36, delete "utilisation" and insert -- utilization --, therefor.

In Column 11, Line 59, delete "utilise." and insert -- utilize. --, therefor.

In Column 12, Line 64, delete "utilise." and insert -- utilize. --, therefor.

In Column 19, Line 55, delete "utilisation" and insert -- utilization --, therefor.

In Column 31, Line 24, delete "1310" and insert -- 1310. --, therefor.

In Column 36, Line 10, delete "X" and insert -- X, --, therefor.

Signed and Sealed this
Sixth Day of August, 2024

Katherine Kelly Vidal
*Director of the United States Patent and Trademark Office*

CERTIFICATE OF CORRECTION (continued)
U.S. Pat. No. 11,949,761 B2

In the Claims

In Column 38, Line 11, in Claim 12, delete "meta data" and insert -- metadata --, therefor.